United States Patent
Medaghri Alaoui et al.

(10) Patent No.: US 10,082,939 B2
(45) Date of Patent: Sep. 25, 2018

(54) PLAYBACK OF MEDIA STREAMS AT SOCIAL GATHERINGS

(71) Applicant: SPOTIFY AB, Stockholm (SE)

(72) Inventors: Souheil Medaghri Alaoui, New York, NY (US); Miles Lennon, New York, NY (US); Kieran Del Pasqua, New York, NY (US)

(73) Assignee: SPOTIFY AB, Stockholm (SE)

( * ) Notice: Subject to any disclaimer, the term of this patent is extended or adjusted under 35 U.S.C. 154(b) by 164 days.

(21) Appl. No.: 14/714,145

(22) Filed: May 15, 2015

(65) Prior Publication Data

US 2016/0337425 A1 Nov. 17, 2016

(51) Int. Cl.
| | |
|---|---|
| *G06F 17/30* | (2006.01) |
| *G06F 3/0484* | (2013.01) |
| *H04L 29/06* | (2006.01) |
| *G06F 3/16* | (2006.01) |
| *G11B 27/02* | (2006.01) |

(Continued)

(52) U.S. Cl.
CPC ......... *G06F 3/04842* (2013.01); *G06F 3/165* (2013.01); *G06F 17/3005* (2013.01); *G06F 17/30053* (2013.01); *G11B 27/02* (2013.01); *H04L 65/4084* (2013.01); *H04L 65/60* (2013.01); *H04N 21/26258* (2013.01); *H04N 21/472* (2013.01); *H04N 21/4825* (2013.01); *H04N 21/6582* (2013.01); *G06F 17/30017* (2013.01)

(58) Field of Classification Search
CPC .......... G06F 17/30017; G06F 17/3005; G06F 17/30053
See application file for complete search history.

(56) References Cited

U.S. PATENT DOCUMENTS

| | | |
|---|---|---|
| 5,892,915 A | 4/1999 | Duso et al. |
| 6,031,478 A | 2/2000 | Oberhammer et al. |

(Continued)

FOREIGN PATENT DOCUMENTS

WO 2014/001913 3/2014

OTHER PUBLICATIONS

Office Action dated Feb. 11, 2016 issued by United States Patent and Trademark Office on U.S. Appl. No. 14/839,427, 15 pages.

(Continued)

*Primary Examiner* — Jeong S Park
(74) *Attorney, Agent, or Firm* — Tucker Ellis LLP

(57) ABSTRACT

This disclosure concerns the providing of media, and more particularly to the streaming of media. In accordance with an example embodiment, a visual queue of media items (e.g. media items B and C) to be played next may be displayed at a user interface of the electronic device. Each one of the media items is associated with media content of a respective media content stream. While a media content stream is being played (e.g., a media content stream associated with media item A), a request to play another media content stream in accordance with a user preference may be received by the electronic device. This request may, for example, be a user selection of one of the available mood options. In response to receiving this request, the visual queue of the media items to be played next can be adjusted, and thus changed, in dependence of the selected mood option.

24 Claims, 19 Drawing Sheets

(51) Int. Cl.
*H04N 21/262* (2011.01)
*H04N 21/472* (2011.01)
*H04N 21/482* (2011.01)
*H04N 21/658* (2011.01)

(56) References Cited

U.S. PATENT DOCUMENTS

| | | |
|---|---|---|
| 6,938,209 B2 | 8/2005 | Ogawa et al. |
| 7,650,570 B2 | 1/2010 | Torrens et al. |
| 7,656,327 B2 | 2/2010 | Filipovic et al. |
| 7,685,210 B2 | 3/2010 | Plastina et al. |
| 7,711,838 B1 | 5/2010 | Boulter et al. |
| 7,873,426 B2 | 1/2011 | Yamada |
| 8,271,112 B2 | 9/2012 | Fujihara et al. |
| 9,195,383 B2 | 11/2015 | Garmark et al. |
| 2002/0019858 A1 | 2/2002 | Kaiser et al. |
| 2003/0221541 A1 | 12/2003 | Platt |
| 2004/0267952 A1 | 12/2004 | He et al. |
| 2006/0122842 A1 | 6/2006 | Herberger et al. |
| 2006/0143236 A1 | 6/2006 | Wu |
| 2006/0224260 A1 | 10/2006 | Hicken et al. |
| 2006/0236847 A1* | 10/2006 | Withop .............. G06F 17/30058 84/612 |
| 2007/0100481 A1* | 5/2007 | Toms ................ G06F 17/30749 700/94 |
| 2007/0162876 A1 | 7/2007 | Quirk |
| 2008/0051919 A1 | 2/2008 | Sakai et al. |
| 2008/0188354 A1 | 8/2008 | Pauws et al. |
| 2008/0250315 A1 | 10/2008 | Eronen et al. |
| 2008/0313222 A1 | 12/2008 | Vignoli et al. |
| 2009/0049979 A1 | 2/2009 | Naik et al. |
| 2009/0063414 A1 | 3/2009 | White et al. |
| 2009/0089327 A1 | 4/2009 | Kalaboukis et al. |
| 2011/0004330 A1* | 1/2011 | Rothkopf ............. G11B 27/105 700/94 |
| 2011/0016120 A1 | 1/2011 | Haughay et al. |
| 2011/0016394 A1 | 1/2011 | DuKane |
| 2011/0035033 A1 | 2/2011 | Friedenberger |
| 2011/0066943 A1 | 3/2011 | Brillon et al. |
| 2011/0246508 A1 | 10/2011 | Maekawa et al. |
| 2011/0252118 A1 | 10/2011 | Pantos et al. |
| 2012/0185070 A1 | 7/2012 | Hagg et al. |
| 2012/0215684 A1 | 8/2012 | Kidron |
| 2012/0311443 A1* | 12/2012 | Chaudhri ............. G11B 27/105 715/716 |
| 2012/0315012 A1 | 12/2012 | Mees |
| 2013/0123583 A1 | 5/2013 | Hill |
| 2013/0178962 A1 | 7/2013 | DiMaria et al. |
| 2013/0205243 A1* | 8/2013 | Rivera ................ G06F 3/04817 715/776 |
| 2013/0211565 A1 | 8/2013 | Kimoto |
| 2013/0290818 A1* | 10/2013 | Arrasvuori ......... H04N 21/4383 715/201 |
| 2013/0339853 A1 | 12/2013 | Hierons et al. |
| 2014/0006483 A1 | 1/2014 | Garmark et al. |
| 2014/0059430 A1 | 2/2014 | White et al. |
| 2014/0123006 A1 | 5/2014 | Chen et al. |
| 2014/0164998 A1 | 6/2014 | Jadhav et al. |
| 2014/0180762 A1 | 6/2014 | Gilbert |
| 2014/0250208 A1 | 9/2014 | Billmaier et al. |
| 2014/0280181 A1 | 9/2014 | Rodger et al. |
| 2014/0281972 A1 | 9/2014 | Kramer et al. |
| 2014/0359444 A1* | 12/2014 | Greenberg-Sanders ................... H04L 65/4007 715/716 |
| 2015/0186509 A1 | 7/2015 | Kelly et al. |
| 2015/0288779 A1 | 10/2015 | Okumura et al. |
| 2016/0027421 A1 | 1/2016 | Eronen et al. |
| 2016/0179318 A1 | 6/2016 | Patel |

OTHER PUBLICATIONS

Office Action dated Dec. 18, 2015 issued by United States Patent and Trademark Office on U.S. Appl. No. 14/839,440, 15 pages.
Office Action dated Nov. 25, 2015 issued by United States Patent and Trademark Office on U.S. Appl. No. 14/839,458, 21 pages.
Office Action dated Sep. 8, 2016 issued by United States Patent and Trademark Office on U.S. Appl. No. 14/839,427, 18 pages.
ID3 draft specification, copyright Nov. 2000, 41 pages.
Office Action dated Jul. 12, 2016 issued by United States Patent and Trademark Office on U.S. Appl. No. 14/714,153, 13 pages.
Office Action dated May 31, 2016 issued by United States Patent and Trademark Office on U.S. Appl. No. 14/839,458, 24 pages.
Office Action dated Oct. 20, 2016 issued by United States Patent and Trademark Office on U.S. Appl. No. 14/714,148, 14 pages.
Office Action dated Jul. 15, 2016 issued by United States Patent and Trademark Office on U.S. Appl. No. 14/839,440, 15 pages.
Office Action dated Dec. 8, 2016 issued by United States Patent and Trademark Office on U.S. Appl. No. 14/714,153, 17 pages.
Office Action dated Mar. 10, 2017 issued by United States Patent and Trademark Office on U.S. Appl. No. 14/839,440, 14 pages.
Notice of Allowance dated May 5, 2017 issued by United States Patent and Trademark Office U.S. Appl. No. 14/839,458, 9 pages.
Notice of Allowance dated Jan. 20, 2017 issued by United States Patent and Trademark Office on U.S. Appl. No. 14/839,458, 9 pages.
Office Action dated Feb. 7, 2017 issued by United States Patent and Trademark Office on U.S. Appl. No. 14/839,427, 10 pages.
Changing The Video In The Player When The Current Playlist Changes, published Jan. 27, 2011 to https://support.brightcove.com/en/video-cloud/docs/changing-video-player-when-current-playlist-changes, retrieved Jan. 26, 2017, 7 pages.
United States Patent and Trademark Office, Office Action dated Mar. 30, 2018 for U.S. Appl. No. 14/839,427, 20 Pages.
Office Action dated Jul. 13, 2017 issued by United States Patent and Trademark Office on U.S. Appl. No. 14/839,427, 18 pages.
Office Action dated Jul. 28, 2017 issued by United States Patent and Trademark Office on U.S. Appl. No. 14/714,148, 15 pages.
Office Action dated Nov. 17, 2017 issued by United States Patent and Trademark Office on U.S. Appl. No. 14/839,440, 16 pages.
Office Action dated Dec. 14, 2017 issued by United States Patent and Trademark Office on U.S. Appl. No. 14/714,153, 19 pages.
Office Action dated Jan. 4, 2018 issued by United States Patent and Trademark Office on U.S. Appl. No. 14/714,148, 16 pages.

* cited by examiner

PLAYBACK OF MEDIA STREAMS AT SOCIAL GATHERINGS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to the providing of media, and more particularly to the streaming of media. In particular, the embodiments described herein relate to methods and electronic devices for performing playback of a media content stream and dynamically controlling a queue of subsequently playable media items, each of which is associated with another media content stream.

BACKGROUND

As computer technology has improved, the digital media industry has evolved greatly in recent years. Users are able to use electronic devices such as mobile communication devices (e.g., cellular telephones, smart phones, tablet computers, etc.) to consume music, video and other forms of media content. For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than receiving a complete file in physical media (such as CD or DVD, or downloading the entire file) before consuming the media content.

At social gatherings, users often wish to share media content with friends, relatives, and new acquaintances. For example, a party host may access media content on a portable electronic device, such as a mobile phone or a tablet computer, and present media content through a media presentation system (e.g., play music on one or several speakers or stream video on a screen).

SUMMARY

It is in view of the above considerations and others that the various embodiments disclosed herein have been made.

It is a general object of the embodiments described herein to allow for an improved way of controlling playback of media, such as music, e.g. at social gatherings.

This general object has been addressed by the appended independent claims. Advantageous embodiments are defined in the appended dependent claims.

In a first of its aspects, this disclosure concerns a method of operating an electronic device for performing playback of a first media content stream and dynamically controlling a queue of subsequently playable media items, each of which is associated with another media content stream.

A visual queue of subsequently playable media items is displayed at a user interface of the electronic device. Each media item is associated with media content of a respective media content stream.

A first request to play another media content stream in accordance with a first user preference is received while the first media content stream is being played. Also, in response to receiving the first request, the queue of subsequently playable media items is adjusted, or otherwise changed, in dependence of the first user preference.

In some embodiments, adjusting the queue of subsequently playable media items in dependence of the first user preference may comprise sending a data message including an instruction to a computer server to return a proposed queue of subsequently playable media items in accordance with the first user preference; receiving a signal comprising a data message including the proposed queue of subsequently playable media items; generating a visual queue of subsequently playable media items corresponding to the proposed queue of subsequently playable media items; and in response thereto displaying the visual queue of subsequently playable media items at the user interface of the electronic device.

The aforementioned first user preference may advantageously be a mood. In an advantageous embodiment, a visual array of selectable mood options can be displayed at the user interface of the electronic device. Each selectable mood option is associated with a respective mood. For example, receiving the first request to play another media content stream in accordance with the first user preference may comprise receiving an instruction to select one of the selectable mood options.

Additionally, a second request to play another media content stream in accordance with a second user preference may be received. In response to receiving the second request, the queue of subsequently playable media items may be adjusted, or otherwise changed, in dependence of a combination of the first user preference and the second user preference.

In some embodiments, adjusting the queue of subsequently playable media items in dependence of the second user preference may comprise sending a data message including an instruction to a computer server to return a proposed queue of subsequently playable media items in accordance with a second user preference; receiving another signal comprising a data message including the proposed queue of subsequently playable media items; generating a visual queue of subsequently playable media items corresponding to the proposed queue of subsequently playable media items; and in response thereto displaying the visual queue of subsequently playable media items at the user interface of the electronic device.

The aforementioned second user preference may comprise a genre, an artist, or a sound.

As will be appreciated, the aforementioned media content stream may comprise an audio content stream, such as a song.

In a second of its aspects, this disclosure concerns an electronic device for performing playback of a first media content stream and for dynamically controlling a queue of subsequently playable media items, each of which is associated with another media content stream. The electronic device comprises a user interface; a processor; and a memory. The electronic device may also comprise a transmitter and a receiver, or alternatively a transceiver. The memory stores computer program code, which, when run in the processor causes the electronic device to display a visual queue of subsequently playable media items at said user interface, wherein each media item is associated with media content of a respective media content stream; and while the first media content stream is being played; receive a first request to play another media content stream in accordance with a first user preference; and in response to receiving the first request, adjust the queue of subsequently playable media items in dependence of the first user preference.

In some embodiments, the memory may store computer program code, which, when run in the processor causes the electronic device to: send, by means of the transmitter, a data message including an instruction to a computer server to return a proposed queue of subsequently playable media items in accordance with a first user preference; and receive, by means of the receiver, another signal comprising a data message including the proposed queue of subsequently playable media items; and generate a visual queue of subsequently playable media items corresponding to the proposed queue of subsequently playable media items; and in response thereto display the visual queue of subsequently playable media items at the user interface of the electronic device.

The first user preference may advantageously comprise a mood. In one embodiment, the memory may further store computer program code, which, when run in the processor causes the electronic device to: display a visual array of selectable mood options, wherein each selectable mood option is associated with a respective mood; and receive an instruction to select one of the selectable mood options.

Still further, the memory may store computer program code, which, when run in the processor causes the electronic device to: receive a second request to play another media content stream in accordance with a second user preference; and in response to receiving the second request, adjust the queue of subsequently playable media items in dependence of a combination of the first user preference and the second user preference.

Yet further, the memory may store computer program code, which, when run in the processor causes the electronic device to: send, by means of the transmitter, a data message including an instruction to a computer server to return a proposed queue of subsequently playable media items in accordance with a second user preference; and receive, by means of the receiver, another signal comprising a data message including the proposed queue of subsequently playable media items; and generate a visual queue of subsequently playable media items corresponding to the proposed queue of subsequently playable media items; and in response thereto display the visual queue of subsequently playable media items at the user interface of the electronic device.

The second user preference may advantageously comprise a genre, an artist, or a sound.

As will be appreciated, the aforementioned media content stream may comprise an audio content stream, such as a song.

In some embodiments, the electronic device is a stationary electronic device, such as a stationary computer. In alternative embodiments, a portable electronic device, such as a portable media presentation device, a mobile telephone, a cellular telephone, a tablet computer, a laptop computer, or a personal digital assistant.

In a third of its aspects, this disclosure concerns a computer program, comprising instructions which, when executed on at least one processor, cause the at least one processor to carry out the method according to the earlier-described first aspect. A carrier comprising the computer program may also be provided. The carrier may for example be one of an electronic signal, an optical signal, a radio signal, or a computer readable storage medium.

Various embodiments described herein allow a user of an electronic device to dynamically control a queue of subsequently playable media items (e.g., songs) on the basis of a user preference. In some advantageous embodiments, the user preference includes a mood. Thus, in one example scenario, a party host may dynamically control the songs to be played next on the basis of the current mood of the people at the party. This may improve the experience of social gatherings such as parties. According to some embodiments, it may also be possible to influence the mood of people at a social gathering. For example, if a party host wishes to change the mood of the people at a social gathering, he or she may in some embodiments select a mood option to adjust the queue of subsequently playable media items to correspond to the desired mood.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for playback of streamed media content may be inadequate. It is therefore a general object of the embodiments described herein to allow for an improved playback of streamed media content.

To address this, in accordance with an embodiment, described herein are a method and an electronic device for performing playback of a first media content stream and, at the same time, dynamically controlling a queue of subsequently playable media items, each of which is associated with another media content stream. A visual queue of subsequently playable media items is displayed at a user interface of the electronic device, each media item being associated with media content of a respective media content stream. Furthermore, while the first media content stream is being played, the electronic device can receive a first request to play another media content stream in accordance with a first user preference such as a mood; and in response to receiving the first request, the queue of subsequently playable media items can be adjusted, and thus changed, in dependence of the first user preference (e.g., a mood).

This way, it is made possible to enable a user of an electronic device to dynamically control a queue of subsequently playable media items (e.g., songs) on the basis of a user preference such as a mood. Thus, in one example scenario, a party host may dynamically control the songs to be played next on the basis of the current mood of the people at the party. This may improve the experience of social gatherings such as parties.

Figure 1:
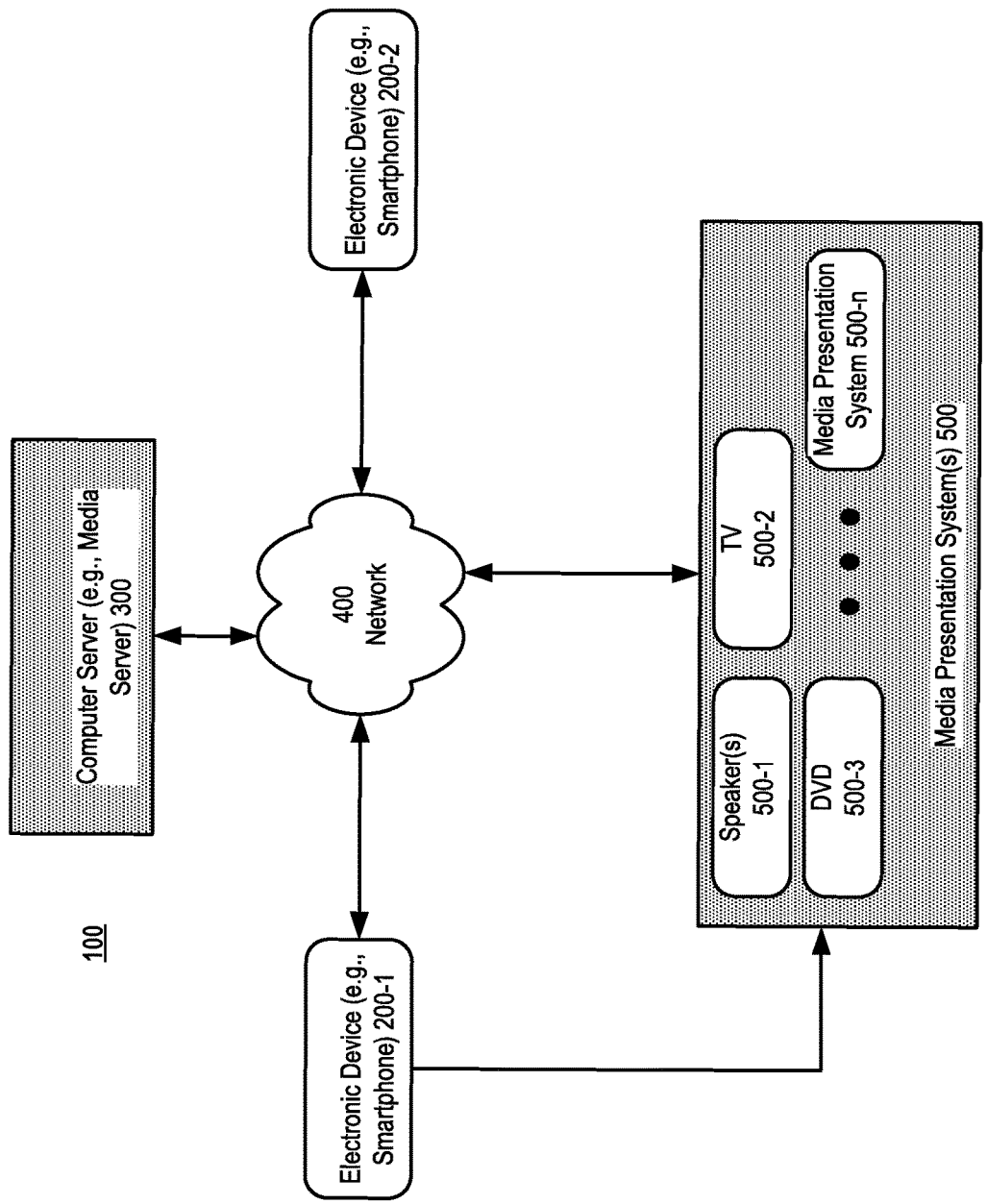
FIG. 1 is a block diagram schematically illustrating an exemplary media content delivery system in accordance with some embodiments.

FIG. 1 is a block diagram illustrating an exemplary media content delivery system 100 in accordance with some embodiments. The media content delivery 100 may comprise one or several electronic devices 200 (e.g., electronic device 200-1 and electronic device 200-2), one or more computer servers 300 (e.g., media content servers also known as media servers), and one or more media presentation systems (e.g., media presentation systems 500 including speaker(s) 500-1, television (TV) 500-2, Digital Versatile Disk (DVD) 500-3, and/or other media presentation system 500-*n*).

In some embodiments, the electronic device 200 may be a mobile telephone, such as a smart phone. Alternatively, the electronic device 200 may be a tablet computer. In yet other embodiments, the electronic device 200 may be any other electronic device capable of playback of media content such as, for example, one of the electronic devices of the following group: a personal computer, a laptop, and a mobile electronic device (e.g. a handheld entertainment device, a digital media player, or other media device).

One or several networks (e.g., network(s) 400) may communicatively connect each component of the media content delivery system 100 with other components of the media content delivery system 100. The network(s) 400 may include public communications networks, private communication networks or a combination of both public and private communication networks. For example, the networks(s) may include any network(s) such as the Internet, other wide area networks (WAN), local area networks (LAN), virtual private networks (VPN), metropolitan area networks (MAN), peer-to-peer networks, and/or ad-hoc networks.

In some embodiments, as is illustrated in FIG. 1, the electronic device 200 (e.g., the electronic device 200-1) is capable of remotely controlling one or more of the media presentation systems 500. To this end, the electronic device 200 may for example implement, or otherwise utilize, any of the techniques described in the international patent application PCT/IB2013/001938 (published under WO 2014/001913 A2) or in U.S. Patent Application Publication No. 2014/0006483 A1, each of which are herein incorporated by reference. For example, it is possible for a user of the electronic device 200 (e.g., the electronic device 200-1 in this example) to remotely control the presentation of media at any one or a combination of the media presentation systems 500. The international patent application PCT/IB2013/001938 and U.S. Patent Application Publication No. 2014/0006483 A1 are incorporated herein by reference to give context to the embodiments described throughout this disclosure. More specifically, the electronic device 200-1 may receive a media control command for a media presentation system 500 (e.g. speaker(s) 500-1). In response to receiving this media control command, the electronic device 200-1 may send a server media control request to the computer server 300 and a local media control request to the media presentation system 500, which may located be within the same local network, e.g. a LAN, as the electronic device 200-1 (i.e., a local network to which both the electronic device 200-1 and the media presentation system 500 are connected). The server media control request may e.g. be sent to the computer server 300 over the Internet. Typically, but not necessarily, the computer server 300 is associated with an Internet Protocol (IP) address outside the space of the local network to which both the electronic device 200-1 and the media presentation system 500 are connected. As will be appreciated, the electronic device 200-1 and the media presentation system 500 may thus be associated with IP addresses within the same sub network. The electronic device 200-1 may hence provide a user interface 230 (see e.g. FIG. 2) that allows a user 600 to select media content for presentation by the electronic device 200-1 itself and, also, to generate media control request(s) to cause the media content to be presented, or played, by the media presentation system 500. Furthermore, the server media request and the local media request are both configured to cause a media control operation, performed at the electronic device 200-1, to be implemented at the media presentation system 500.

In an example scenario related to a social gathering, a host (i.e., a user) may thus interact with his or her electronic device 200-1 to remotely control the playback of media content at the media presentation system 500, e.g. the playback of streamed music through loudspeakers(s) 500-1. This way, it is for example possible for a party host (i.e., the user) to control the playback of music that is to be played at the social gathering, e.g. a party.

Figure 2:
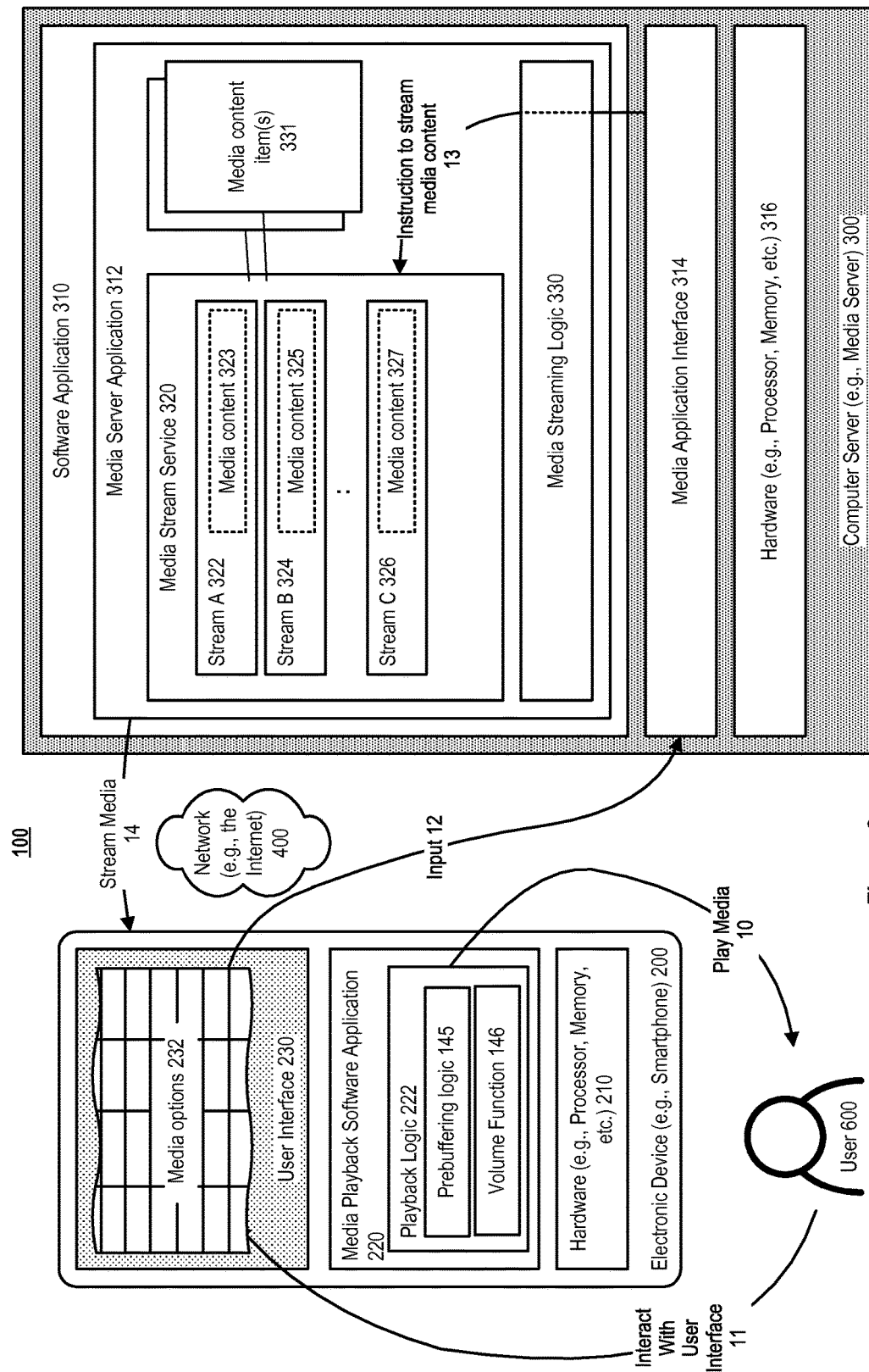
FIG. 2 illustrates an example embodiment of a system for playback of a media content stream and dynamic control of a queue of subsequently playable media items, in accordance with an embodiment.

Turning now to FIG. 2, an example environment where embodiments of this disclosure may be applied will be described. An electronic device 200, e.g. electronic device 200-1 of FIG. 1, may be communicatively connectable to the computer server 300 via the network 400, e.g. the Internet, as described hereinabove. As can be seen in FIG. 2, only a single electronic device 200 and a single computer server 300 are shown. However, the computer server 300 may support the simultaneous use of multiple electronic devices, and/or the electronic device 200 can simultaneously access media content at multiple computer servers 300. Although FIG. 2 illustrates the computer server 300 in accordance with one example embodiment, FIG. 2 is intended more as a functional description of the various features, or components, which may be present in one or more computer servers, rather than a structural schematic of the various implementations described throughout this disclosure. In practice, and as recognized by persons skilled in the art, components shown separately could be combined and some components could be separated.

In the following description and in order not to obscure the detailed description with unnecessary detail, the media content will in general be exemplified to be audio content, e.g. in form of music. This should, however, not be interpreted as limiting the scope of the various embodiments of the disclosed embodiments.

As is schematically shown in FIG. 2, the electronic device 200 may be used for the playback of media content (e.g., audio content such as music), which is provided by the computer server 300. The electronic device 200 may include one or several physical computer resources, or hardware resources 210. The hardware resources 210 may e.g. include one or several processors (or, processing circuitry), a communications interface (or, communication circuitry) and one or several memories. Likewise, the computer server 300 operating as a media server may include one or several physical computer resources, or hardware resources 316. The hardware resources 316 may likewise include e.g. include one or several processors (or, processing circuitry), a communications interface (or, communication circuitry) and one or several memories.

The computer server 300 may include an operating system or other processing system which supports execution of a software application 310, including a media server application 312 which may be used, for example, to stream media content. A media stream service 320 may be used to buffer media content, for streaming to one or more media streams 322, 324, 326. A media application interface 314 may receive requests from electronic devices 200 or other systems, to retrieve media content 331 from the computer server 300.

Media content 331, or media items, may be provided, for example, within a first storage such as a memory (e.g., including a database), or may be received by the computer server 300 from another source (not shown). This another source (not shown) could be external to the computer server 300, i.e. it may be located remotely from the computer server 300.

A media streaming logic 330 may be used to retrieve or otherwise access the media content 331 in response to requests from electronic devices 200 or other systems, and populate the media stream service with streams 322, 324, 326 of corresponding media content data 323, 325, 327 that may be returned, i.e. streamed, to the requesting electronic device 200.

The electronic device 200 comprises a user interface 230, which is adapted to display or otherwise provide a visual array of media options 232, for example as a two-dimensional grid, a list, or other visual array format, and determine a user input. Each media option in the visual array of media options 232 correspond to a respective media stream 322, 324, 326.

Selecting a particular media option within the visual array 232 may be used, or otherwise interpreted, as a request or instruction to the media server application 312 to stream or otherwise return a corresponding particular media content item. For example, in accordance with some embodiments, the software application 310 at the computer server 300 may be used to stream or otherwise communicate media content to the electronic device 200, wherein the user interface 230 at the electronic device 200 is adapted to display a plurality of media options that correspond to respective media streams.

In accordance with some embodiments, the electronic device 200 may also include a media playback application 220, together with a playback logic 222, pre-buffering logic 145, and a volume function 146, which may be used to control the playback of media content that is received from the media server application 312, for playback by the electronic device 200, as described in further detail below.

A user 600 may interact 11 with the user interface 230 and issue requests, for example the playing of a selected media option at the electronic device 200. The user's selection of a particular media option may be communicated 12 to the media server application 312, via the media application interface 314. The media server application 312 may then be instructed 13 to stream corresponding media content 13, including one or more streams of media content data 323, 325, 327, and subsequently stream 14 or otherwise communicate the, e.g., selected media, to the user's electronic device 200. In accordance with some embodiments, pre-buffering requests from the electronic device 200 may also be communicated 12 to the media server application 312 via the media application interface 314. At the electronic device 200, in response to the user's interaction with the user interface 230, the media playback application 220, including the playback logic 222, may play 10 the requested media content to the user 600.

FIGS. 3A-3I illustrate an electronic device 200 with an exemplary user interface 230 which supports playback of a media content stream (e.g., an audio content stream), in accordance with an embodiment. The user interface 230 typically includes output device(s) and input device(s), as is known and conventional in the art. In some implementations, the input devices may include a keyboard, a mouse or a track pad. Alternatively, or in addition, in some implementations, the user interface 230 includes a display that includes a touch-sensitive surface, in which case the display is a touch-sensitive display. In electronic devices 200 that have a touch-sensitive display, a soft keyboard may be displayed when keyboard entry is needed. A soft keyboard is a keyboard that replaces the physical keyboard on electronic devices 200 having touch-sensitive displays. Hence, in electronic devices 200 that have a touch-sensitive display a physical keyboard is optional. The output devices may for example include one or more speakers and/or one or more audio output connections for connecting to external speaker(s), headphones or earphones. Optionally, the input devices may further include an audio input device (e.g., a microphone) to capture audio (e.g., speech). Still further, the input devices may also optionally comprise audio recognition device(s) to recognize audio (e.g., speech), which in combination with a microphone, may for example supplement or replace the keyboard.

Figure 3A:
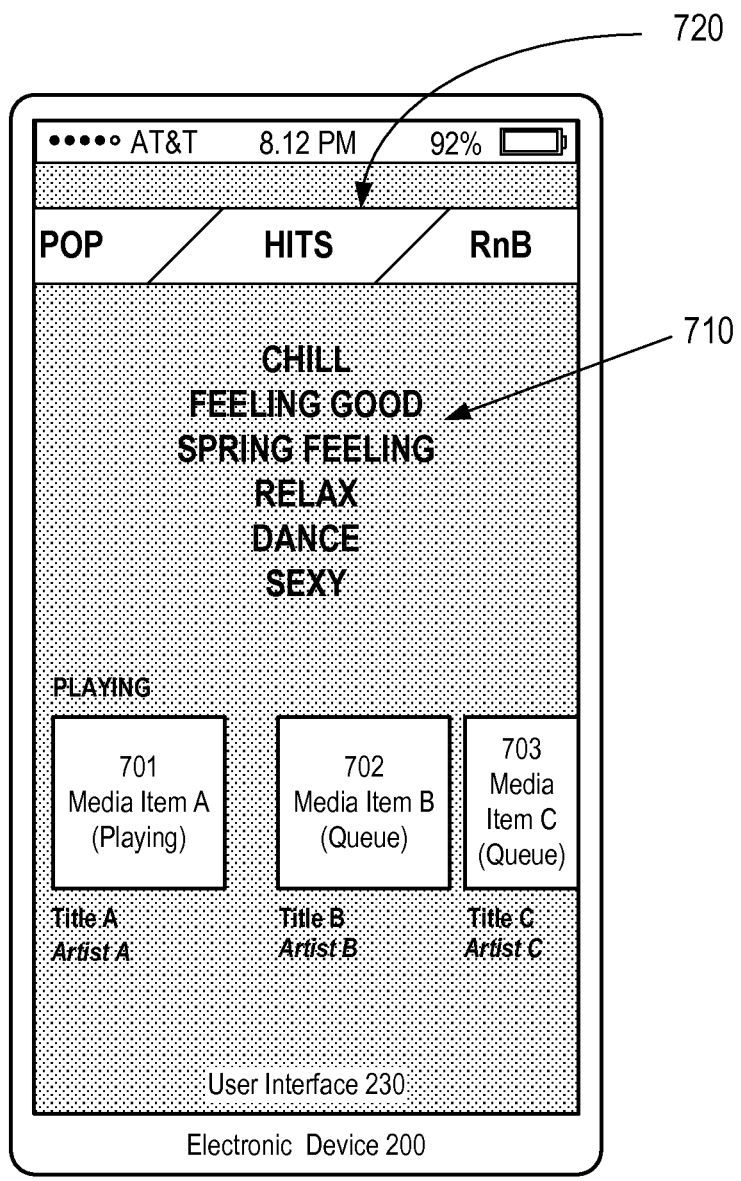
FIGS. 3A-3I schematically illustrates an example embodiment of a user interface of an electronic device, e.g. in the form of a smart phone, which supports playback of a media content stream and, simultaneously, dynamic control of a visual queue of subsequently playable media items.
Figure 3B:
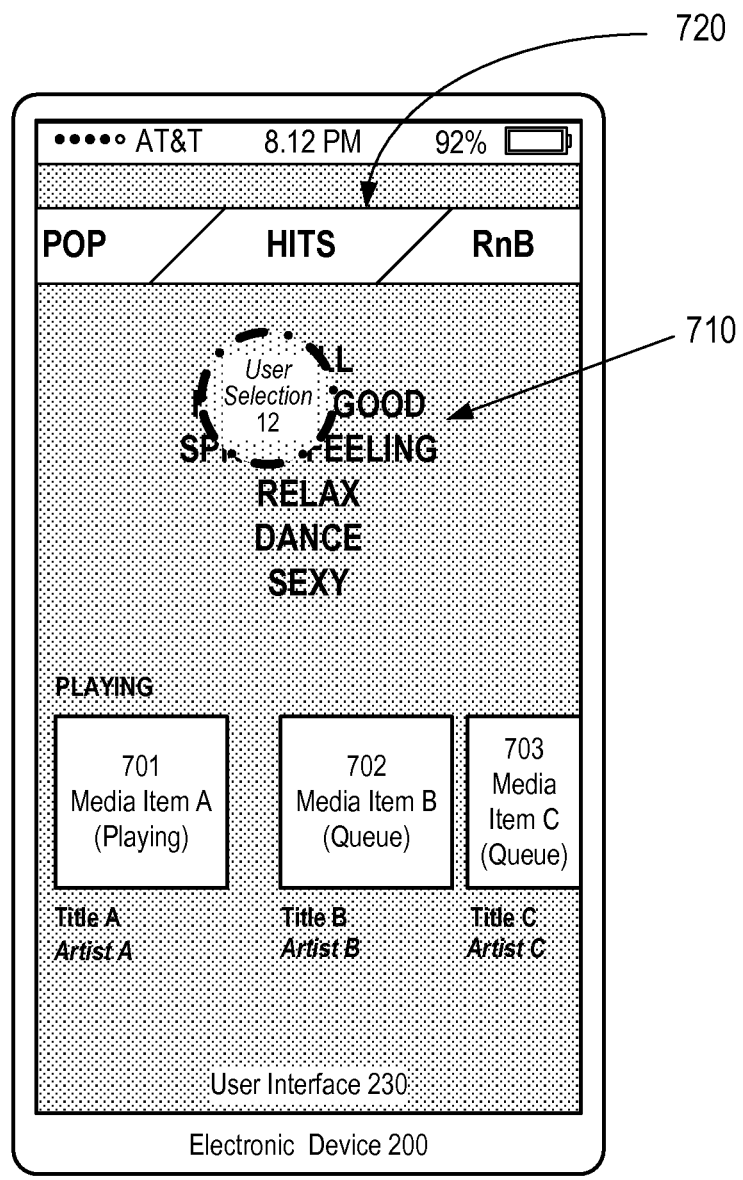

In an embodiment, such as in the example illustrated in FIG. 3A, the user interface 230 includes a display that includes a touch-sensitive surface. A first media content stream A (e.g., a song A) is being played. For example, this first media stream A may be played at speaker(s) 500-1 that is/are being remotely controlled by the electronic device 200, e.g. as described earlier hereinabove.

At the user interface 230 of the electronic device, a media item A associated with the media content stream A (e.g., media content stream 322 of FIG. 2) that is currently being played may be presented at 701. For example, the media item A (701) may be displayed as an image tile or the like. In some embodiments, the media item A (701) may include an image, e.g. a cover art. As is exemplified in FIG. 3A, further information about the currently played media content stream (e.g., a title of the song, an artist, or the like) may be displayed, or otherwise presented, at the user interface 230.

As can be seen in FIG. 3A, a visual queue of subsequently playable media items B (702) and C (703) can also be displayed or otherwise presented, at the user interface 230 of the electronic device 200. Each of the subsequently playable media items B (702) and C (703) is associated with media content of a respective media content stream, e.g. media content streams 324 and 326 (see FIG. 2). In some embodiments, the media items B (702) and C (703) may also be displayed as image tiles or the like. Furthermore, the media items B (702) and C (703) may include a respective image, e.g. a cover art. As is exemplified in FIG. 3A, further information about the media items B (702) and C (703), such as a title of the song and/or an artist, may also be provided at the user interface 230.

In the example embodiment shown in FIG. 3A, a visual array 710 of selectable mood options is also displayed, or otherwise presented, at the user interface 230. In this example, the visual array 710 of selectable mood options is exemplified by a list including a variety of mood options. Each mood option in the array 710 of mood options is associated with a respective mood, i.e. an emotional state. In this example embodiment, various moods are exemplified by the following mood options: "chill", "feeling good", "spring feeling", "relax", "dance", and "sexy". For instance, a press gesture or a tap gesture within a display area corresponding to one of the mood options (e.g., "feeling good") may be interpreted by the electronic device 200 to be a request, or instruction, to select the corresponding mood option. That is, upon the user 600 performing a press gesture or a tap gesture over the display area corresponding one of the mood options (e.g., "feeling good"), this can be interpreted by the electronic device 200 to represent a mood selection by the user 600.

Optionally, a visual array 720 of genre options may additionally be displayed, or otherwise presented, at the user interface 230. In this example, the visual array 720 of genre options is exemplified by a list of genre options (e.g., "pop", "hits", "RnB"). In alternative embodiments, the visual array 720 may for example include artist options, or sound options.

Upon the user performing a swipe gesture, e.g. a left-to-right swipe gesture, over the display area corresponding to the visual array 720 of genre options, it is possible for the user to view and select a genre option from displayed genre options. For example, the above-mentioned left-to-right swipe gesture may be interpreted by the electronic device 200 to be a request, or instruction, to the user interface 230 to dynamically present the available genre options by scrolling the available genre options from left to right. Likewise, a right-to left swipe gesture may be interpreted by the electronic device 200 to be a request, or instruction, to the user interface 230 to dynamically present the available genre options by scrolling the available genre options from right to left.

Figure 3C:
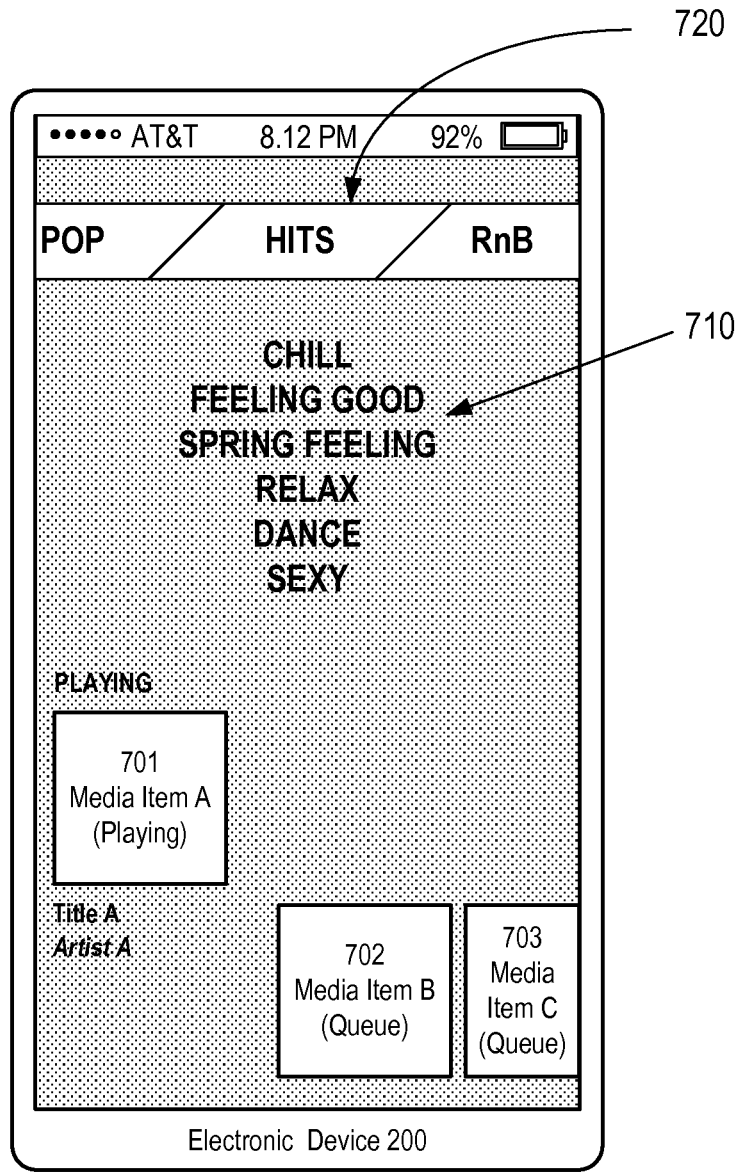
Figure 3D:
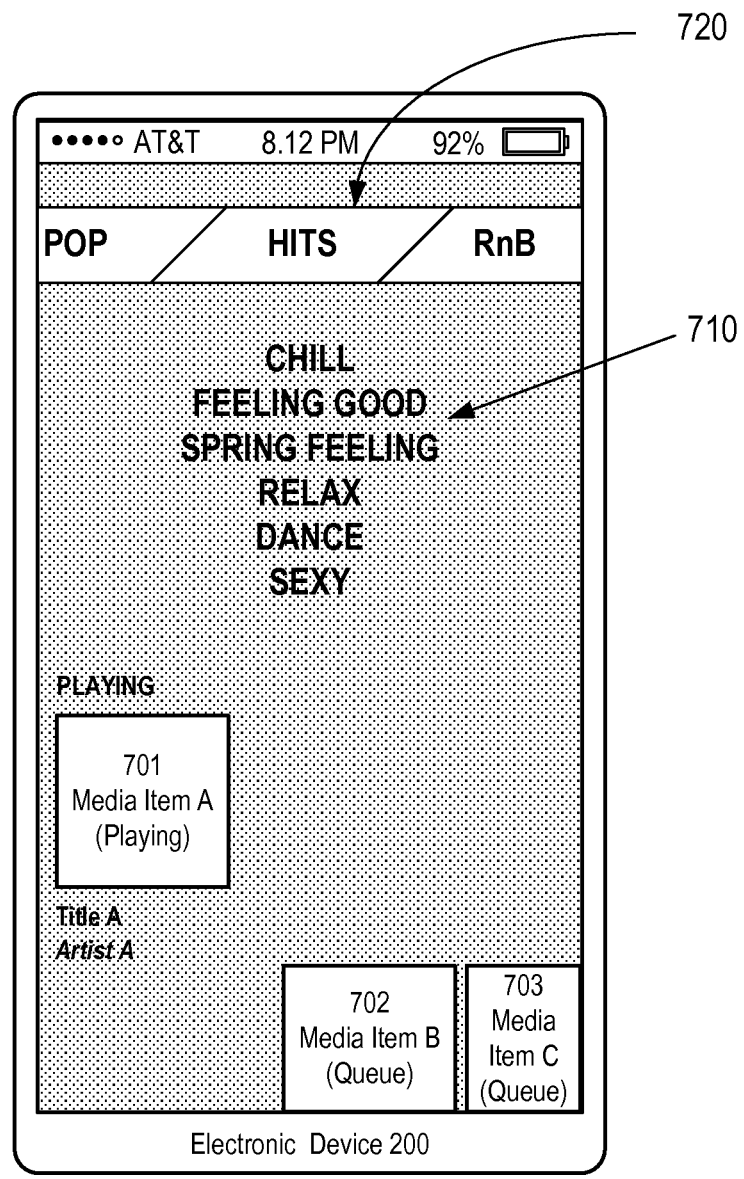
Figure 3E:
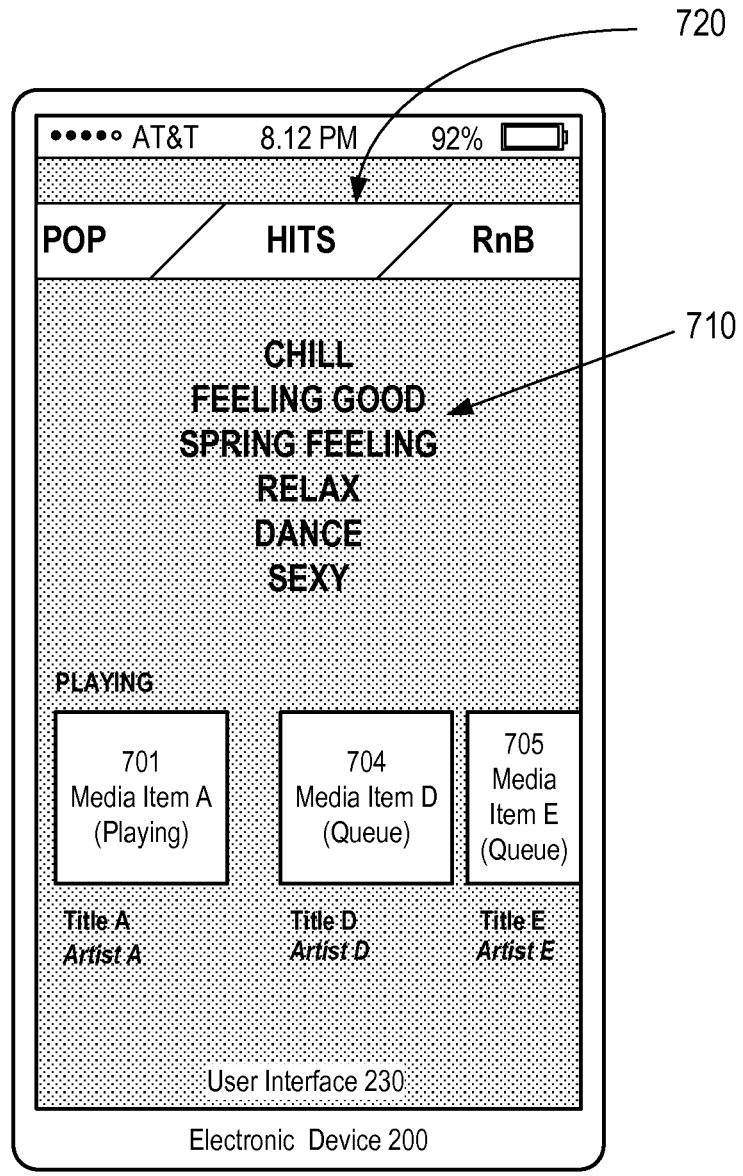
Figure 3F:
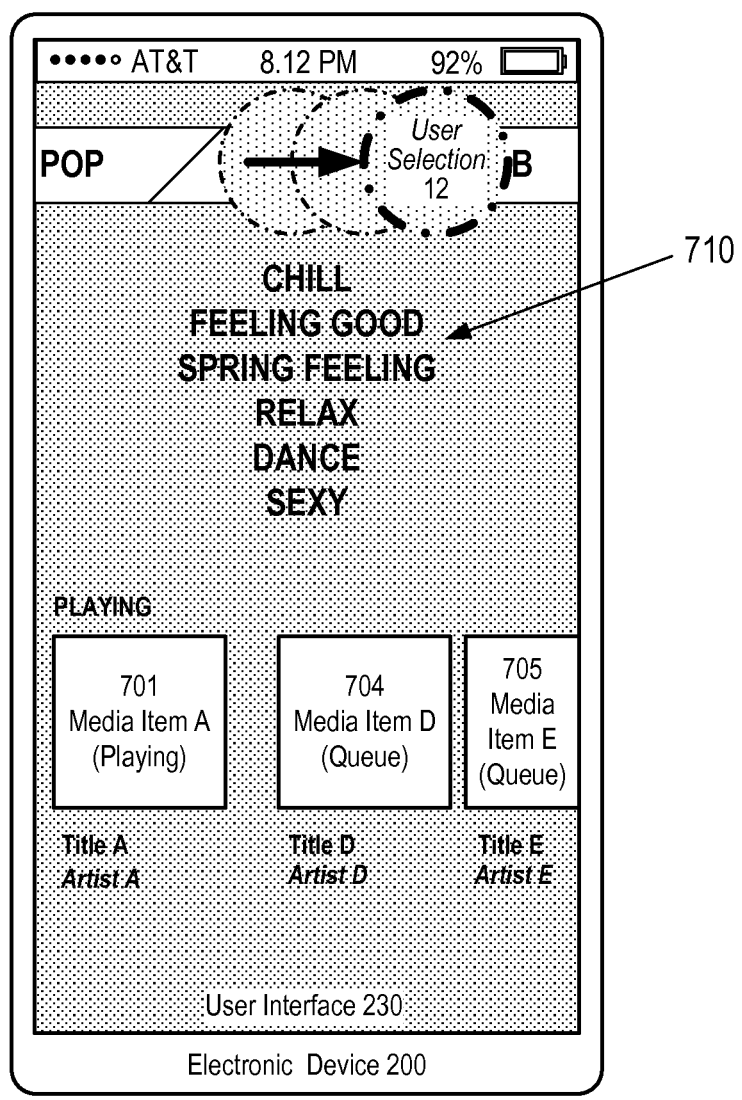
Figure 3G:
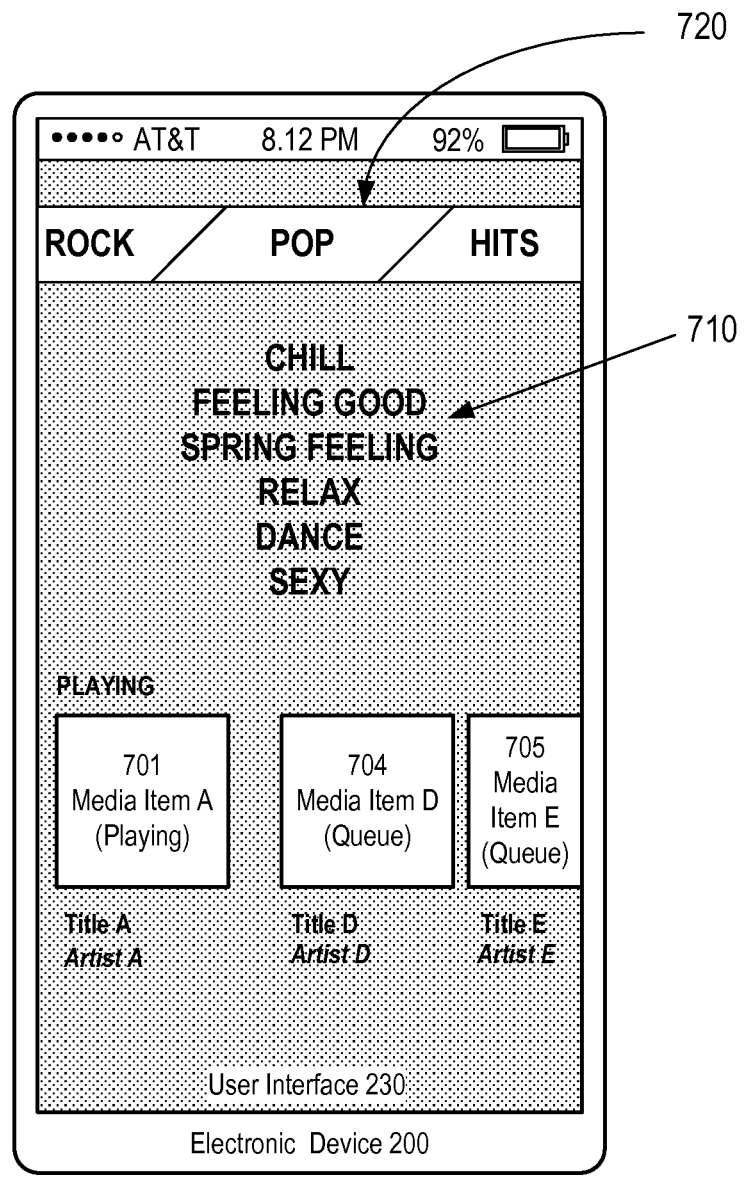
Figure 3H:
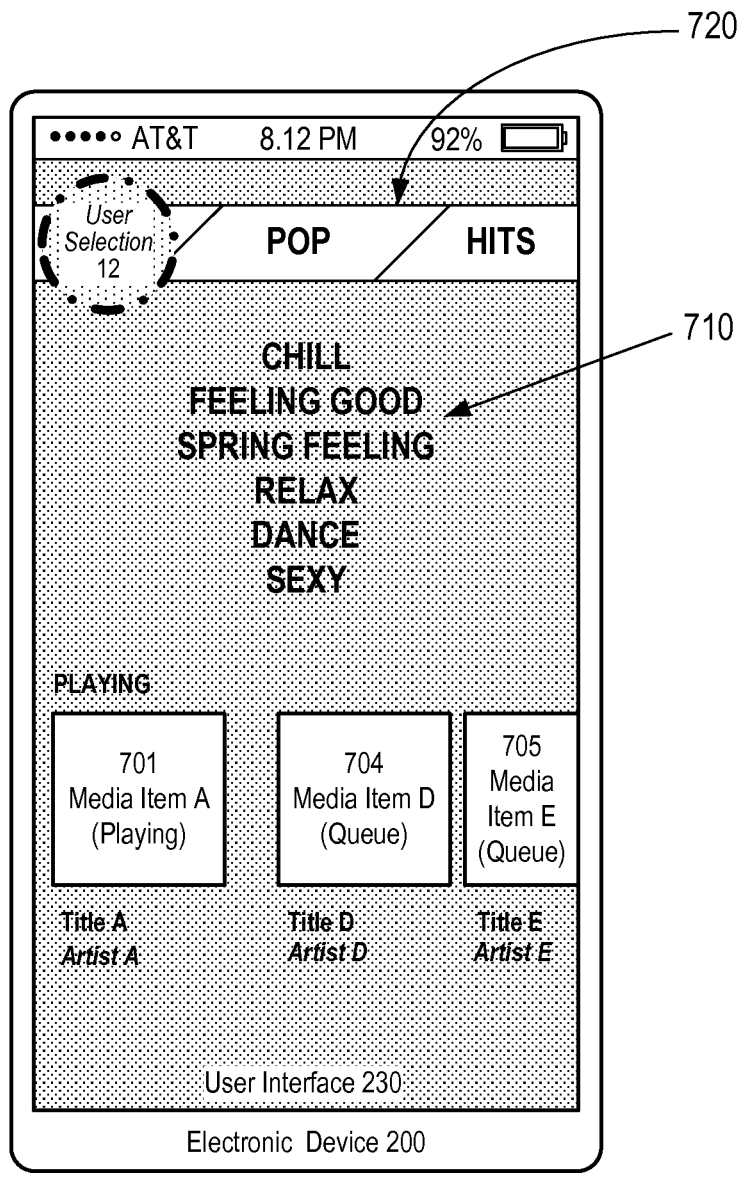
Figure 3I:
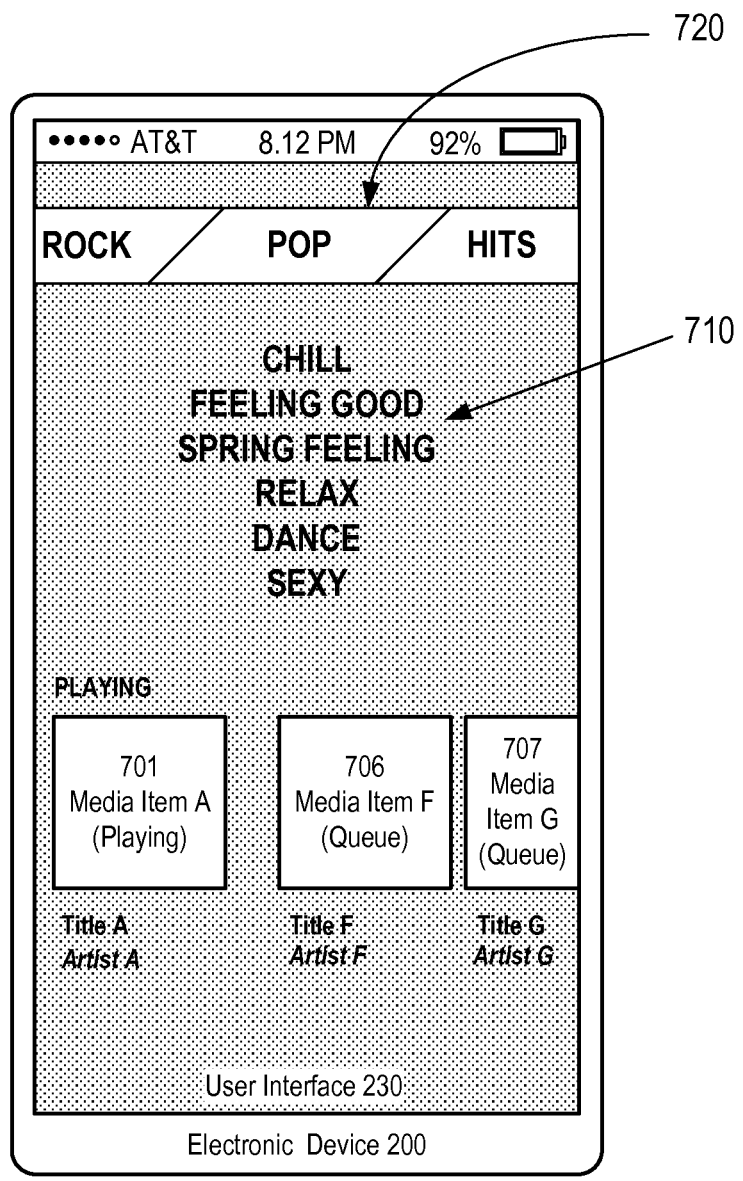

Turning now to FIGS. 3B-3E, an example embodiment will be further explained. While the first media content stream (i.e., song A in this example) is being played, the pre-buffering logic 145 of the playback logic 222 may start pre-buffering content related to the next media content stream in the queue, i.e. the media content stream 324 associated with media item B (702) in this example. In accordance with this example embodiment, while the first media content stream (i.e., song A in this example) is being played, e.g. through speakers(s) 500-1 being remotely controlled by the electronic device 200, a first request to play another media content streaming in accordance with a first user preference is received by the electronic device 200. For example, receiving the first request to play another media content stream in accordance with the first user preference may include receiving a request, or instruction, to select one of the selectable mood options from the displayed visual array 710 of mood options. In other words, upon the user 600 performing a press gesture or a tap gesture 12 over the display area corresponding one of the mood options (e.g., "feeling good" in this example), this can be interpreted by the electronic device 200 to represent a mood selection by the user 600. In response to receiving this first request, the queue of subsequently playable media items is adjusted, and thus changed, as can be seen in FIGS. 3C-3E.

In some embodiments, adjusting the queue of subsequently playable media items in dependence of the first user preference comprises the electronic device 200 sending a data message including an instruction to a computer server 300 (see FIG. 2) to return a proposed queue of subsequently playable media items in accordance with the first user preference, i.e. in accordance with the selected mood option in this example. The electronic device 200 further receives a signal comprising a data message including the proposed queue of subsequently playable media items. Furthermore, a visual queue of (new) subsequently playable media items D (704) and E (705) corresponding to the proposed queue of subsequently playable media items can be generated. In response thereto, the, the visual queue of subsequently playable media items D (704) and E (705) can be displayed, or otherwise presented, at the user interface 230 of the electronic device 200.

The generation of the proposed queue of subsequently playable media items is not the main focus of this disclosure. Rather, this disclosure focuses on the dynamic control of media content to be played, or presented, next, i.e. subsequent to a currently played media content stream. There exist various techniques for generating suggested playlists on the basis of different factors, which are known in the art. As one mere example, the U.S. Patent Application Publication No. 2014/0280181 A1 describes some techniques for generating playlists.

As can be seen in FIGS. 3C-3E, upon a user's selection 12 of one of the mood options in the visual array 710 of mood options, the queue of subsequently playable media items is adjusted, and thus changed, in dependence of the selected mood option. In this example, it is possible to allow for a "wipe effect" transition where one queue of media items (here represented by media items B (702) and C (703)) is wiped away to reveal another queue of media items (here represented by media items D (704) and C (705)). As can be seen in FIGS. 3B-3E, the media content stream 322 associated with media item A (701) may still be playing during the switch from the first queue of media items (here represented by media items B (702) and C (703)) to the second queue of media items (here represented by media items D (704) and E (705)). In other words, in some embodiments, the media content stream of the first media item in the queue will not begin to play until the playback of the currently played media content stream is completed, or alternatively stopped. For example, a song associated with the media item A (701) may continue to play as the media items B (702) and C (703) slide off the display of the user interface (e.g. as shown in FIGS. 3C-3D) and while these media items are replaced by the new media items D (704) and E (705).

Hereby it is made possible for a user 600 of an electronic device to control the queue of subsequently playable media items (e.g., songs), e.g. during a remote control of the playback of the media at a media presentation system, in real time on the basis of a selected mood. Thus, in one example scenario, a party host (i.e., the user 600) may control the songs to be played next on the basis of the current mood of the people at a social gathering such as a party. This may improve the experience of social gatherings. Furthermore, it may be possible to influence the mood of people at a social gathering. For example, if a party host wishes to change the mood of the people at a social gathering, he or she may select a mood option to adjust the queue of subsequently playable media items to correspond to the desired mood. For example, the party host may desire to get the people at the party into a "feeling good" mood at the beginning of the party. By selecting "feeling good" from the visual array 710 of mood options the queue of subsequently playable media items can thus be changed to include media items corresponding to the selected mood, i.e. media items corresponding to a "feeling good" mood in this example.

In some embodiments, as illustrated in FIGS. 3F-3I, the user may optionally also control the queue of subsequently playable media items in accordance with a second user preference, here exemplified by a genre (such as "pop", "hits", RnB"). Accordingly, while the first media content stream (i.e., song A in this example) is being played, e.g. through the speakers(s) 500-1 that is/are remotely controlled by the electronic device 200, a second request to play another media content streaming in accordance with a second user preference can be received by the electronic device 200. For example, upon the user 600 performing a swipe gesture, e.g. a left-to-right swipe gesture, over the display area corresponding to the visual array 720 of genre options, it is possible for the user to scroll through and view the available genre options of the visual array 720 of genre options. Furthermore, upon the user 600 performing a press gesture or a tap gesture 12 over the display area corresponding one of the available genre options (e.g., "rock" in the example of FIG. 3H), this can be interpreted by the electronic device 200 to represent a genre selection by the user 600. In response to receiving this second request, the queue of subsequently playable media items can be adjusted, and thus changed, which can be seen in FIG. 3I where media options D (704) and E (705) have been changed (thus, replaced) to media options F (706) and G (707). In other words, in response to receiving this second request, the adjustment, and thus change, of the queue of subsequently playable media items can be made in dependence of a combination of the first user preference (i.e., mood in this example) and the second user preference (i.e., genre in this example).

In some embodiments, adjusting the queue of subsequently playable media items in dependence of the second user preference comprises the electronic device 200 sending a data message including an instruction to a computer server 300 to return a proposed queue of subsequently playable media items in accordance with the second user preference, i.e. in dependence of the selected genre option. The electronic device 200 further receives, from the computer server 300, a signal comprising a data message including the proposed queue of subsequently playable media items. Furthermore, a visual queue of (new) subsequently playable media items F (706) and G (707) corresponding to the proposed queue of subsequently playable media items can be generated. In response thereto, the, the visual queue of subsequently playable media items F (706) and G (707) can be displayed, or otherwise presented, at the user interface 230 of the electronic device 200, see e.g. FIG. 3I.

Hereby it is made possible for a user 600 of an electronic device to control the queue of subsequently playable media items (e.g., songs), e.g. by remotely controlling the playback of the media at a media presentation system, in real time on the basis of a selected mood as well as a genre. Thus, in one example scenario, a party host (i.e., the user 600) may control the songs to be played next on the basis of the current mood of the people at the party as well as a desired music genre. This may improve the experience of social gatherings such as parties even further. Furthermore, it may be possible to influence the mood of people at the social gathering.

While the visual array 720 of genre options in FIGS. 3A-3I list a few example genres, it should be appreciated that some embodiments may also include sub-genres. For example, the illustrated top genre "hits" may include the sub-genres "70's", "80's", "90's", etc. In some embodiments, upon a user's 600 selection of one of the available genres, a list of available sub-genres for the selected genre can be displayed, or otherwise presented, at the user interface 230.

Figure 4A:
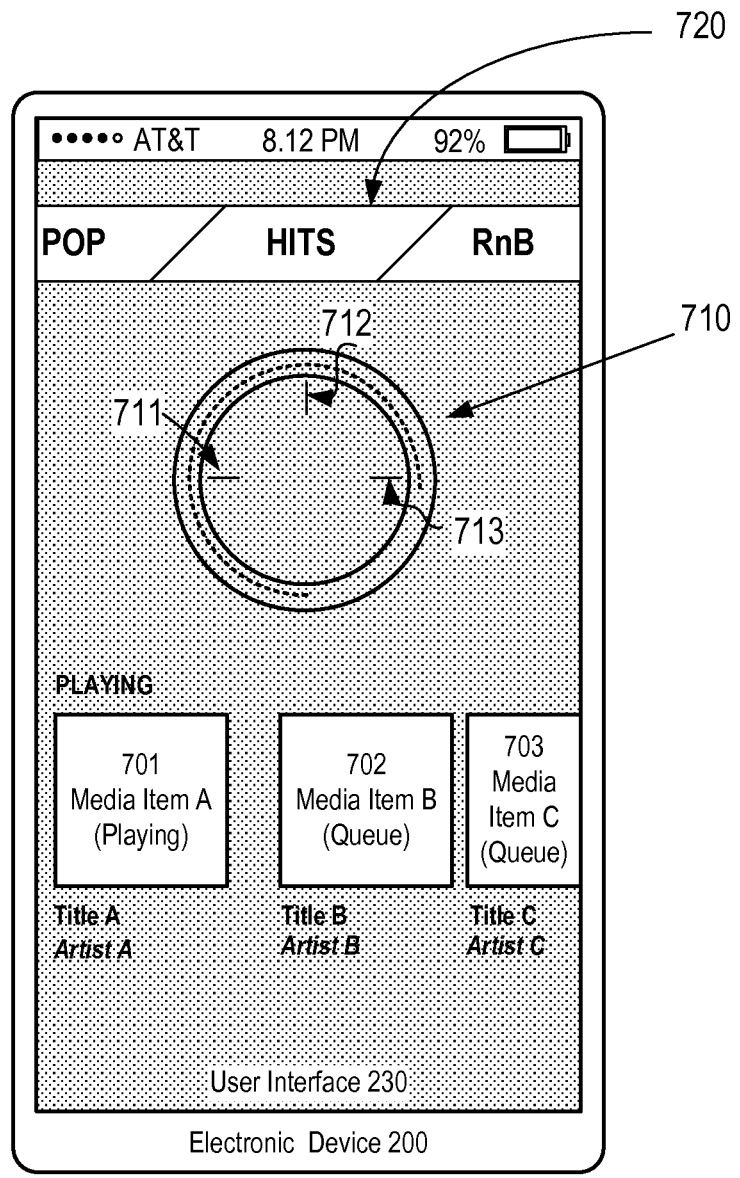
FIGS. 4A-4C schematically illustrates another example embodiment of a user interface of an electronic device, e.g. in the form of a smart phone, which supports playback of a media content stream and, simultaneously, dynamic control of a visual queue of subsequently playable media items.
Figure 4B:
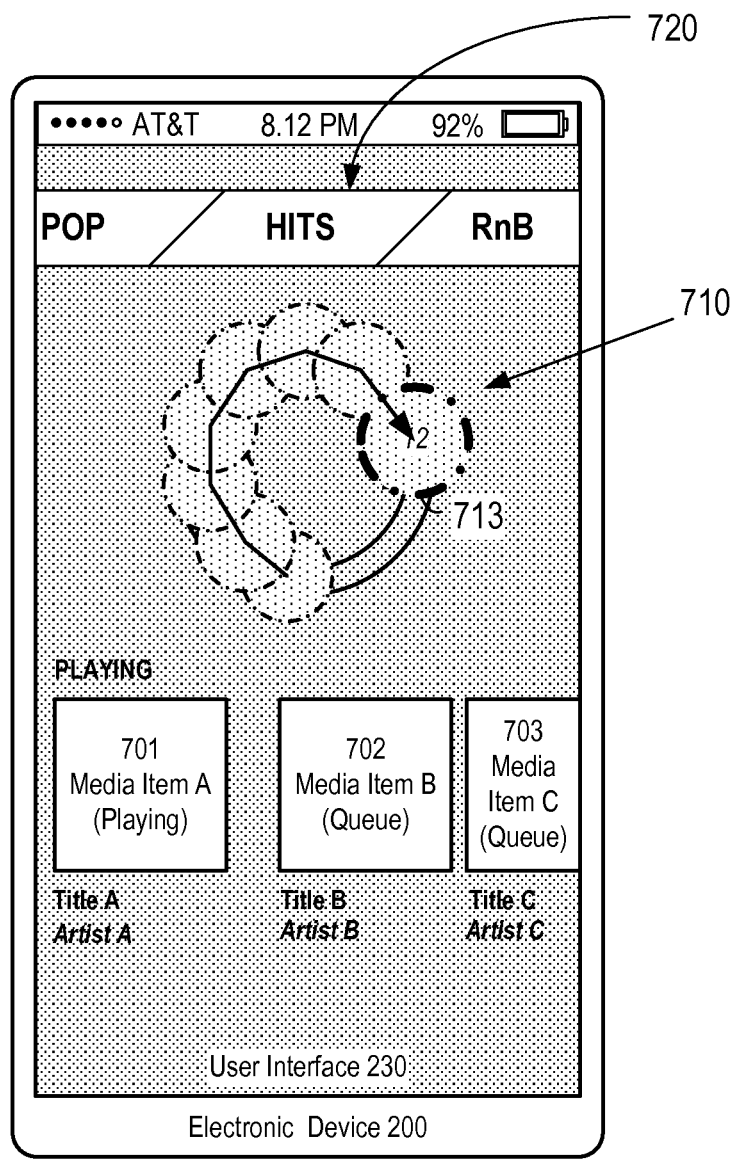
Figure 4C:
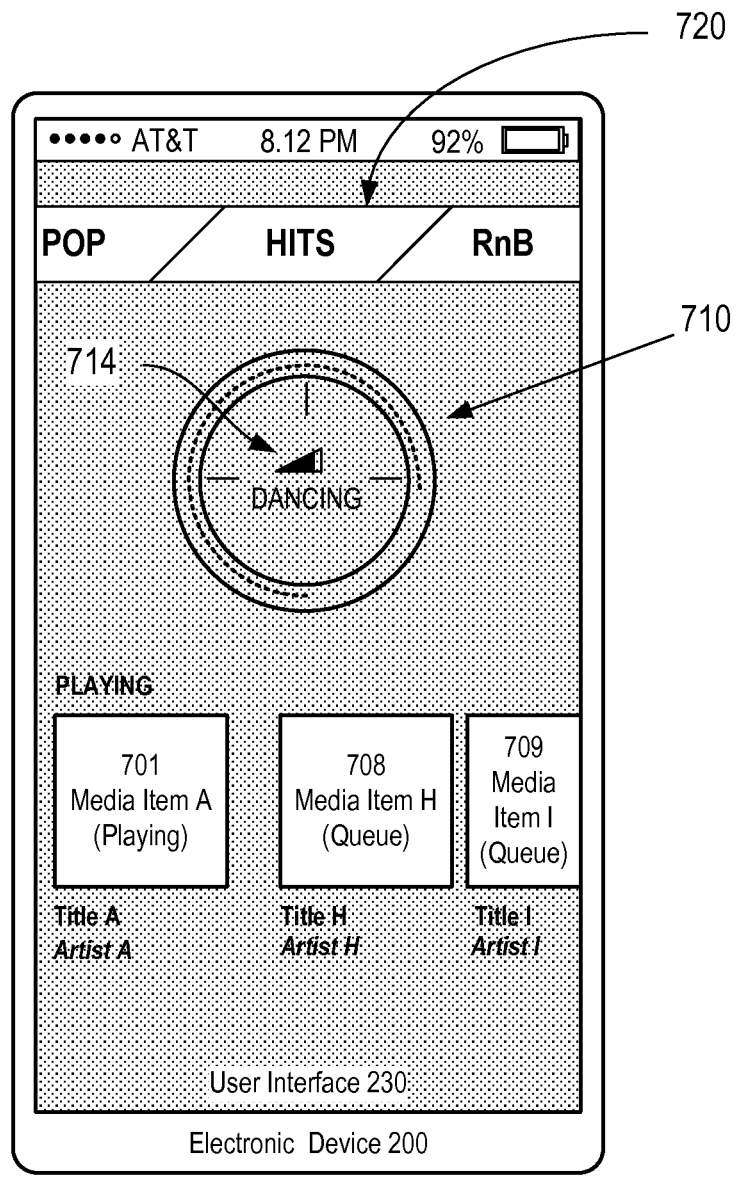

With reference to FIGS. 4A-4C, another embodiment will be briefly described. In this example embodiment, the visual array 710 of mood options is represented by a soft keyboard including a circular control device. The circular control device includes different mood levels 711, 712, 713. The different mood levels 711, 712 and 713 may represent different emotional states. In an example embodiment, mood level 711 may represent a low energy level (e.g. "chill"), mood level 712 may represent a medium energy level (e.g., "upbeat") and mood level 713 may represent a high energy level (e.g., "dancing"). As can be seen in FIG. 4B, upon a user 600 performing a hovering gesture along the circular control device 710, the user may select his or her mood option 711, 712 or 713. In this example, the user 600 performs a hovering gesture from a start position of the circular control device to an end position corresponding to a position at the mood level 713. Upon the user 600 completing his or her hovering gesture at the position of the mood level 713, this can be interpreted by the electronic device 200 to represent a user selection of mood level 713. In response to receiving this request, the queue of subsequently playable media items is adjusted accordingly, as can be seen in FIG. 4C. In other words, the queue of subsequently playable media items can be changed to include media options H (708) and I (709) corresponding to the selected mood level. The adjustment of the queue can e.g. be performed in the same or a similar manner as described hereinabove with respect to FIGS. 3C-3E where a first queue of subsequently playable media items slides off the display screen of the user interface 230 and a new, second, queue of subsequently playable media items fades in and becomes displayed at the user interface 230. Optionally, an icon 714 representing the selected mood option (here exemplified by mood level 713) may be displayed at the user interface 230. Hereby, the user of the electronic device 200 can be informed about the selected mood option in a convenient and user-friendly way.

Still another example embodiment will be briefly discussed with reference to FIGS. 5A-5B. In this example embodiment, the visual array 710 of mood options is replaced by combination of a soft keyboard 715 to control the recording of audio (e.g., speech or noise) at a social gathering (e.g., a party), an audio input device (e.g., a microphone) to capture audio, and audio recognition software to recognize audio. Upon the user 600 performing a press gesture or a tap pressure at a display area corresponding to the illustrated "PLAY" button, this can be interpreted by the electronic device 200 to be a request, or instruction, to begin recording audio (i.e., audio surrounding the electronic device 200) by means of the audio input device. Upon the user 600 subsequently performing a press gesture or a tap pressure at a display area corresponding to a displayed "STOP" button (not shown), this can be interpreted by the electronic device 200 to be a request, or instruction, to stop recording the audio. Utilizing the audio recognition software it is then possible to recognize the recorded audio and, for example, classify the recorded audio into different mood levels, e.g. low energy level (e.g., "chill"), medium energy level (e.g., "upbeat") and high energy level (e.g., "dancing"). Once classified, this classified mood may be interpreted by the electronic device 200 to represent a user request, or instruction, to select the classified mood level. In response to receiving this user request, the queue of subsequently playable media items can be adjusted accordingly, as can be seen in FIG. 5B, such that the new queue of playable media items H (708) and I (709) fit the classified, thus selected, mood level. In other words, the queue of subsequently playable media items is changed to include media options H (708) and I (709) corresponding to the selected mood level. The adjustment of the queue can e.g. be performed in the same or a similar manner as described hereinabove with respect to FIGS. 3C-3E where a first queue of subsequently playable media items slides off the display screen of the user interface 230 and the new, second, queue of subsequently playable media items becomes displayed at the user interface 230.

The embodiment described with reference to FIGS. 5A-5B allows for a user to sense the mood at a social gathering (e.g., the party mood at a party) and adapt the selection of the media to be played next in dependence of the sensed current mood at the social gathering. In other words, this embodiment may e.g. allow for playback of media (e.g., music) at a social gathering that adaptively follows a current mood of the people at the social gathering.

Figure 5A:
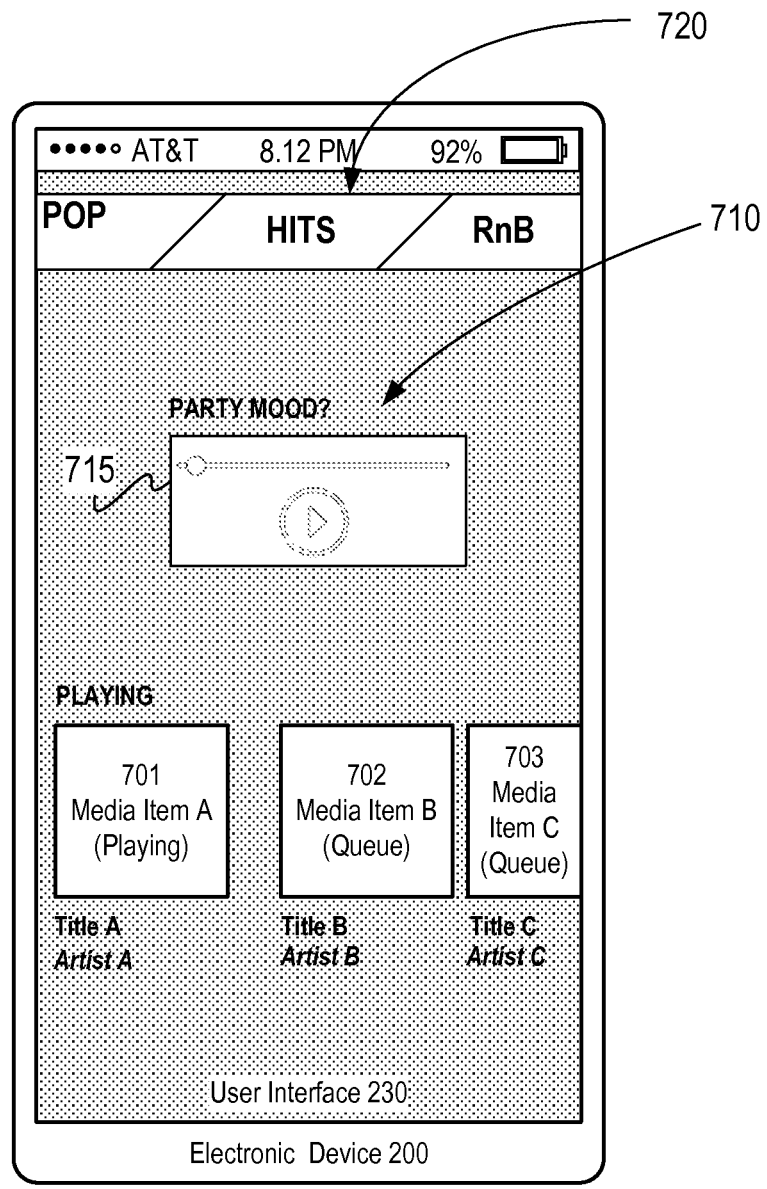
FIGS. 5A-5B schematically illustrates still another example embodiment of a user interface of an electronic device, e.g. in the form of a smart phone, which supports playback of a media content stream and, simultaneously, dynamic control of a visual queue of subsequently playable media items.
Figure 5B:
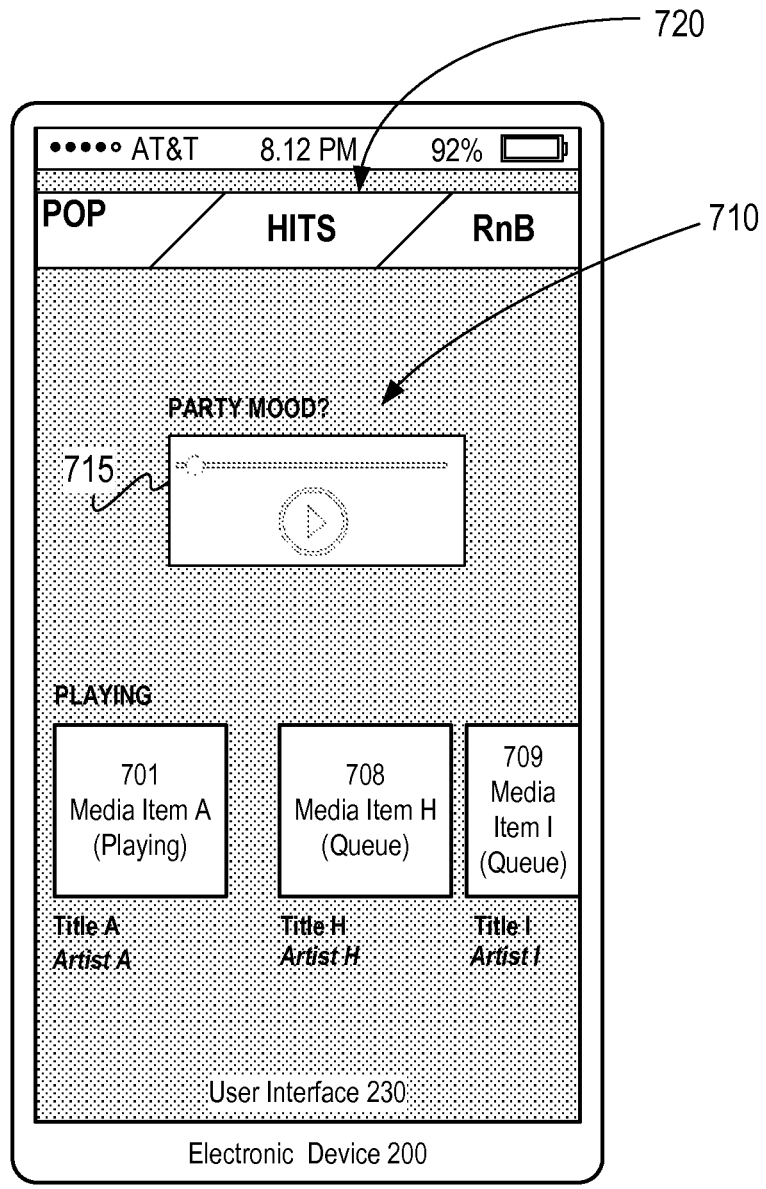

While the embodiment described with respect to FIGS. 5A-5B proposes recording audio and classify the mood level on the basis of the recorded audio it should be appreciated that alternatively, or additionally, it may be conceivable to record a video (e.g., from the social gathering) and classify the mood level on the basis of the thus recorded video.

Figure 6A:
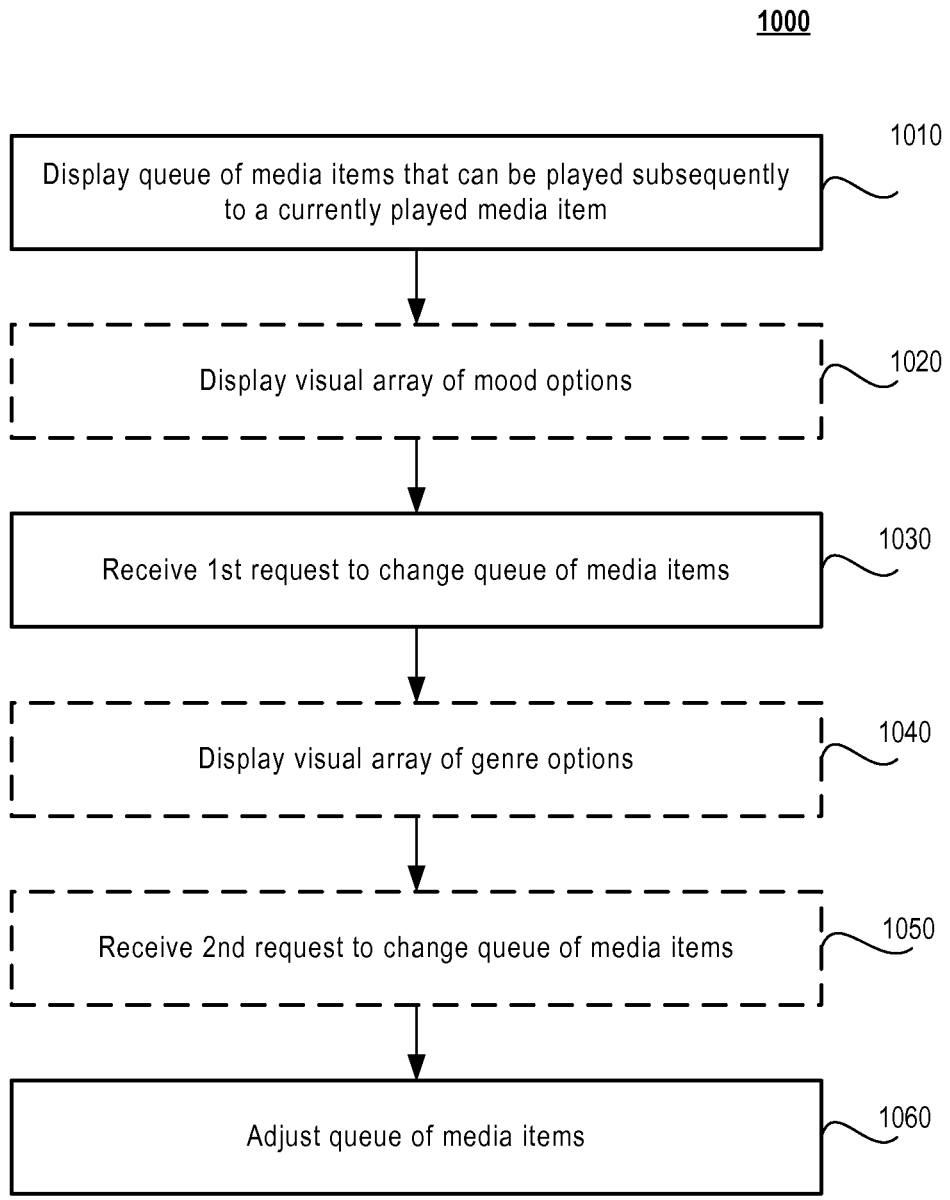
FIGS. 6A-6C schematically illustrate flowcharts of a method in accordance with an embodiment.
Figure 6B:
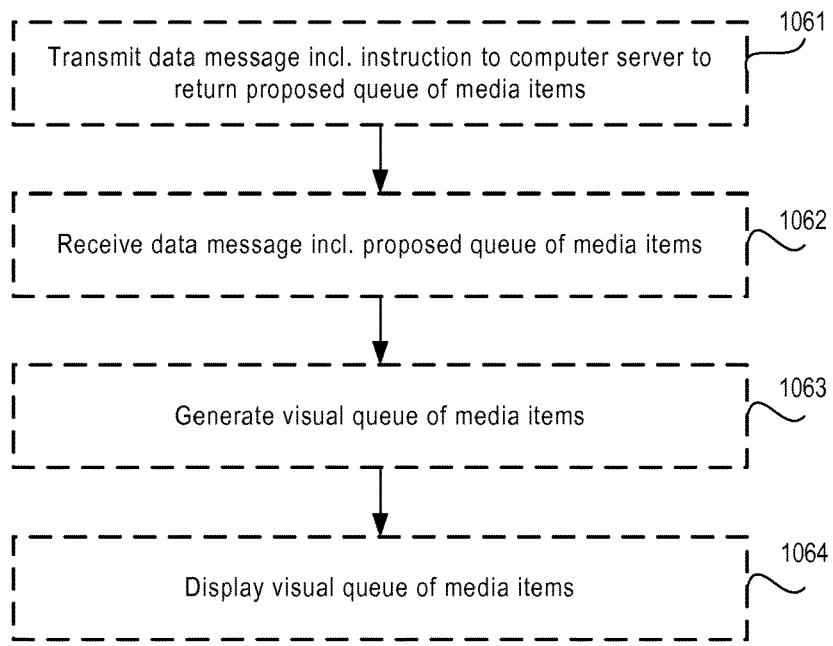
Figure 6C:
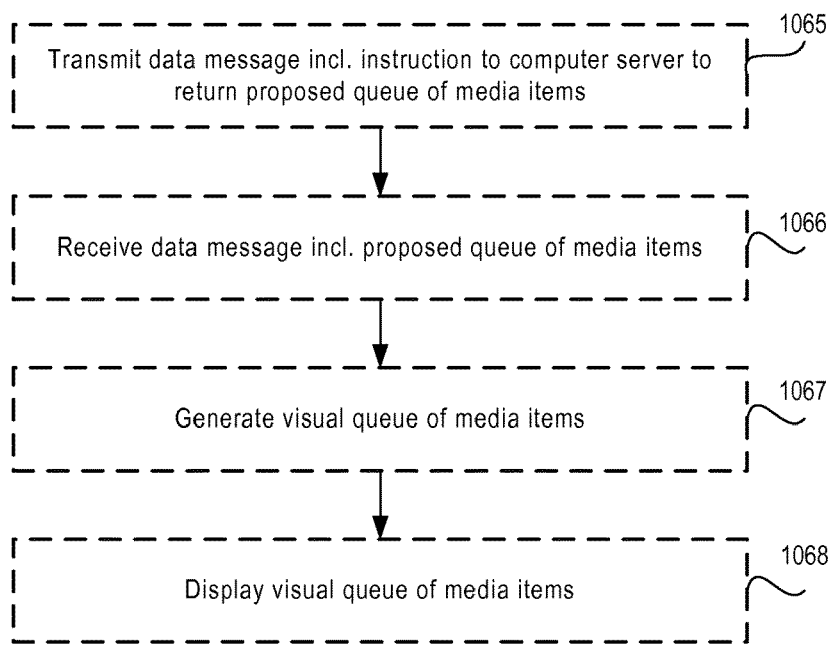

With reference to FIGS. 6A-6C, a method 1000 of operating an electronic device 200 will be described. The method 1000 may be suitable for performing playback of a first media content stream and for dynamically controlling a queue of subsequently playable media items, each of which is associated with another media content stream.

A visual queue of subsequently playable media items is displayed 1010 at a user interface of the electronic device. In other words, a visual queue of media items that can be played next (i.e. after a currently played media content stream) is displayed 1010 at the user interface of the electronic device. Each media item is associated with media content of a respective media content stream.

While a first media content stream is being played, e.g. through speaker(s) 500-1 that are being remotely controlled by the electronic device 200, a first request to play another media content stream in accordance with a first user preference is received 1030.

In response to receiving this first request, the queue of subsequently playable media items is adjusted 1060, or changed, in dependence of the first user preference. Accordingly, the queue of subsequently playable media items can be adjusted 1060 to fit the first user preference.

In advantageous embodiments, this first user preference is a mood (e.g., an emotional state). For example, in some embodiments, a visual array of selectable mood options is displayed 1020 at the user interface of the electronic device. Each selectable mood option is associated with a respective mood. Receiving 1030 the first request to play another media content stream in accordance with the first user preference may thus comprise receiving a request, or instruction, to select one of the selectable mood options.

Turning to FIG. 6B, it should be appreciated that adjusting 1060 the queue of subsequently playable media items in dependence of the first user preference may comprise sending 1061 a data message including an instruction to a computer server 300 (see FIG. 2) to return a proposed queue of subsequently playable media items in accordance with the first user preference; receiving 1062 a signal comprising a data message including the proposed queue of subsequently playable media items; generating 1063 a visual queue of subsequently playable media items corresponding to the proposed queue of subsequently playable media items; and in response thereto displaying 1064 the visual queue of subsequently playable media items at the user interface of the electronic device.

In some particularly advantageous embodiments, the method 1000 may optionally also comprise receiving 1050 a second request to play another media content stream in accordance with a second user preference. In response to receiving 1050 the second request, the queue of subsequently playable media items can thus be adjusted 1060 in dependence of a combination of the first user preference and the second user preference.

For example, this second user preference may be a genre. For example, in some embodiments, a visual array of selectable genre options is displayed 1040 at the user interface of the electronic device. Each selectable genre option may be associated with a respective genre. Receiving 1050 the second request to play another media content stream in accordance with the second user preference may thus comprise receiving a request, or instruction, to select one of the selectable genre options. In alternative embodiments, the second user preference may e.g. include an artist, a sound, or the like.

Turning to FIG. 6C, it should be appreciated that adjusting 1060 the queue of subsequently playable media items in dependence of the second user preference may comprise sending 1065 a data message including an instruction to a computer server 300 (see FIG. 2) to return a proposed queue of subsequently playable media items in accordance with a second user preference; receiving 1066 another signal comprising a data message including the proposed queue of subsequently playable media items; generating 1067 a visual queue of subsequently playable media items corresponding to the proposed queue of subsequently playable media items; and in response thereto displaying 1068 the visual queue of subsequently playable media items at a user interface of the electronic device.

In FIGS. 6A-6C, the method steps or actions are schematically illustrated in a certain order. It will be appreciated that the other orders are equally possible. As one mere example, in embodiments where the queue of subsequently playable media items is adjusted based on a combination of the first and the second user preferences, the above-mentioned second request may, e.g., be received 1050 prior to receipt 1030 of the first request.

Figure 7:
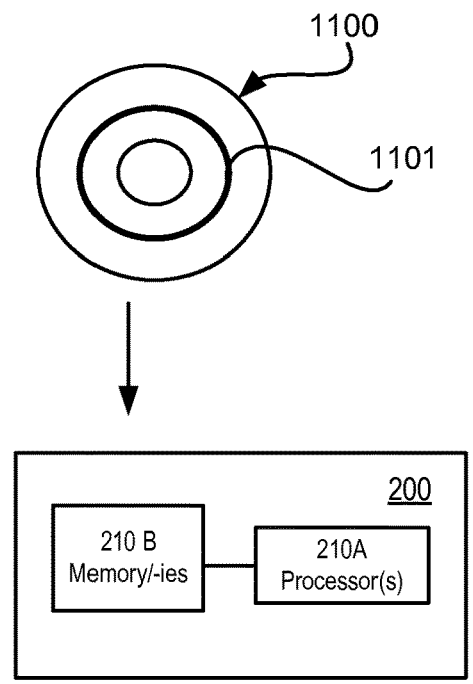
FIG. 7 illustrates a carrier containing a computer program, in accordance with an embodiment.

Turning now to FIG. 7, still another embodiment will be briefly discussed. FIG. 7 shows an example of a computer-readable medium, in this example in the form of a data disc 1100. In one embodiment the data disc 1100 is a magnetic data storage disc. The data disc 1100 is configured to carry instructions 1101 that can be loaded into a memory 210B of an electronic device 200. Upon execution of said instructions by a processor 210A of the electronic device 200, the electronic device 200 is caused to execute a method or procedure according to any one of the embodiments described in this disclosure. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium can also be other mediums such as compact discs, digital video discs, flash memories or other memory technologies commonly used. In such an embodiment the data disc 1100 is one type of a tangible computer-readable medium. The instructions may alternatively be downloaded to a computer data reading device, such as an electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

Figure 8:
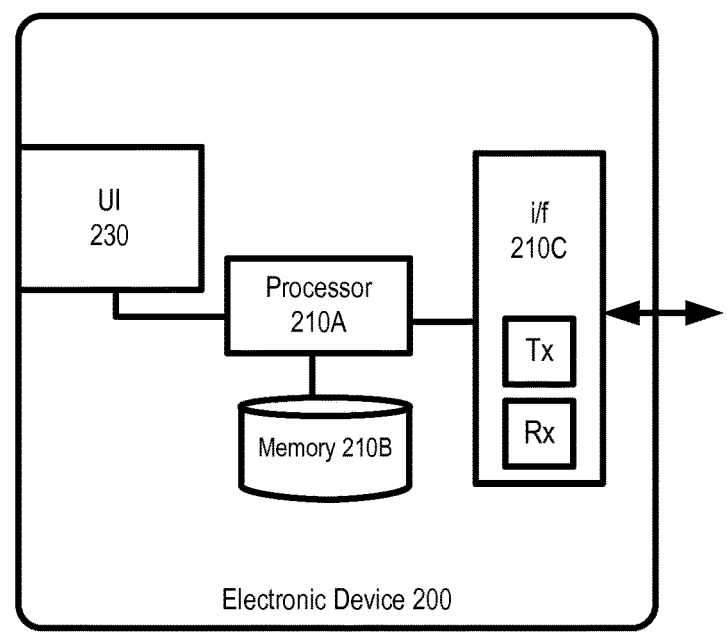
FIG. 8 illustrates an example implementation of an embodiment of an electronic device as illustrated in any one of FIGS. 1-5.

With reference to FIG. 8, an example implementation of the electronic device 200 of FIGS. 1-5 will be described in some further detail. For example, the electronic device 200 may be implemented as a stationary electronic device, such as a stationary computer. Alternatively, the electronic device 200 may be embodied as a portable electronic device, such as a mobile telephone, a cellular telephone, a tablet computer, a laptop computer, or a personal digital assistant.

In some embodiments, the electronic device 200 may comprise means adapted to perform the method described herein with reference to FIGS. 6A-6C. In one embodiment, the electronic device 200 thus comprises means adapted to display a visual queue of subsequently playable media items at a user interface of the electronic device, wherein each media item is associated with media content of a respective media content stream. The electronic device 200 further comprises means adapted to receive a first request to play another media content stream in accordance with a first user preference while the first media content stream is currently being played. Furthermore, the electronic device 200 comprises means adapted to adjust the queue of subsequently playable media items in dependence of the first user preference in response to receiving the first request.

For example, the electronic device 200 may also comprise means adapted to send a data message including an instruction to a computer server to return a proposed queue of subsequently playable media items in accordance with the first user preference. Also, the electronic device 200 may comprise means adapted to receive a signal comprising a data message including the proposed queue of subsequently playable media items. Moreover, the electronic device 200 may comprise means adapted to generate a visual queue of subsequently playable media items corresponding to the proposed queue of subsequently playable media items. Still further, the electronic device 200 may comprise means adapted to display the generated visual queue of subsequently playable media items at the user interface of the electronic device.

As mentioned earlier, the first user preference comprises a mood. For instance, the electronic device 200 may optionally also comprise means adapted to display a visual array of selectable mood options, wherein each selectable mood option is associated with a respective mood.

The electronic device 200 may also comprise means adapted to receive a second request to play another media content stream in accordance with a second user preference. Still further, the electronic device 200 may comprise means adapted to adjust the queue of subsequently playable media items in dependence of a combination of the first user preference and the second user preference.

For instance, the electronic device 200 may further comprise means adapted to send a data message including an instruction to a computer server to return a proposed queue of subsequently playable media items in accordance with a second user preference; means adapted to receive another signal comprising a data message including the proposed queue of subsequently playable media items; means adapted to generate a visual queue of subsequently playable media items corresponding to the proposed queue of subsequently playable media items; and means adapted to display the visual queue of subsequently playable media items at a user interface of the electronic device.

As mentioned earlier, the second user preference may comprise a genre, an artist, or a sound.

With continued reference to FIG. 8, an example implementation of the electronic device 200 will now be described. The electronic device 200 is configured to execute, or otherwise perform, any of the methods described herein. As is schematically illustrated in FIG. 8, the electronic device 200 comprises hardware 210A-C. For example, the electronic device 200 may comprise one or more processors 210A and one or more memories 210B. Also, a communications interface 210C may be provided in order to allow the electronic device 200 to communicate with other electronic devices and/or computer servers 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the electronic device 200 to communicate with other devices and/or computer servers 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. Thus, the electronic device 200 may be configured to remotely control media presentation system(s) 500 as described earlier hereinabove. The electronic device 200 may further comprise a user interface 230, which may be comprised of a display and a keypad. Advantageously, the user interface includes a touch-sensitive display as described earlier in this disclosure. As such, the touch-sensitive display may be a touch screen display upon which virtual keys may be displayed and operated. Furthermore, the user interface 230 may include output means such as loudspeakers (not shown) and/or one or several audio output connections as described earlier herein. As described with reference to FIG. 1, the electronic device 200 may also comprise one or more applications, e.g. the media playback application 220. These applications may include sets of instructions (e.g., computer program code) that when executed by the one or more processors 210A controls the operation of the electronic device 200.

In some implementations, the one or more memories 210B stores computer program code, which, when run in the one or more processors 210A causes the electronic device 200 to display a visual queue of subsequently playable media items at said user interface 230, wherein each media item is associated with media content of a respective media content stream; and while the first media content stream is being played; to receive a first request to play another media content stream in accordance with a first user preference; and, furthermore, in response to receiving the first request, to adjust the queue of subsequently playable media items in dependence of the first user preference.

In some implementations, the one or more memories 210B stores computer program code, which, when run in the one or more processors 210A causes the electronic device to: send, by means of a transmitter 210C, a data message including an instruction to a computer server 300 to return a proposed queue of subsequently playable media items in accordance with the first user preference; receive, by means of the receiver 201C, another signal comprising a data message including the proposed queue of subsequently playable media items; and generate a visual queue of subsequently playable media items corresponding to the proposed queue of subsequently playable media items; and in response thereto display the visual queue of subsequently playable media items at the user interface 230 of the electronic device 200.

Again, the first user preference may e.g. be a mood. For example, the one or more memories 210B may also store computer program code, which, when run in the one or more processors 210A causes the electronic device 200 to display a visual array of selectable mood options at the user interface 230, wherein each selectable mood option is associated with a respective mood; and receive an instruction to select one of the selectable mood options.

In some implementations, one or more memories 210B may also store computer program code, which, when run in the one or more processors 210A causes the electronic device 200 to receive a second request to play another media content stream in accordance with a second user preference, and in response to receiving the second request, adjust the queue of subsequently playable media items in dependence of a combination of the first user preference and the second user preference.

Furthermore, in some implementations, the one or more memories 210B may also store computer program code, which, when run in the one or more processors 210A causes the electronic device 200 to: send, by means of the transmitter 210C, a data message including an instruction to a computer server 300 to return a proposed queue of subsequently playable media items in accordance with a second user preference; receive, by means of the receiver 210C, another signal comprising a data message including the proposed queue of subsequently playable media items; and generate a visual queue of subsequently playable media items corresponding to the proposed queue of subsequently playable media items; and in response thereto display the visual queue of subsequently playable media items at the user interface 230 of the electronic device 200.

Various embodiments described herein enable improved playback of streamed media content, e.g. at social gatherings such as parties. The described embodiments allow for a user of an electronic device 200 to dynamically control a queue of media items (e.g., songs) to be played next on the basis of a user preference such as a mood. Thus, in one example scenario, a party host (i.e., the user) may dynamically control the songs to be played next on the basis of the current mood of the people at a social gathering such as a party. This may improve the experience of the people at social gatherings. According to some embodiments, it may also be possible to influence the mood of people at a social gathering. For example, if a party host wishes to influence the mood of the people at a social gathering, he or she may in some embodiments select a mood option to adjust the queue of subsequently playable media items to correspond to the desired mood.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice.

Furthermore, it should be appreciated that embodiments described in this disclosure could be advantageously combined with any one of the embodiments described in the co-filed U.S. patent application Ser. No. 14/714,148, filed on May 15, 2015, entitled "METHODS AND DEVICES FOR ADJUSTMENT OF THE ENERGY LEVEL OF A PLAYED AUDIO STREAM", inventors Souheil Medaghri Alaoui, et al, and/or in the co-filed U.S. patent application Ser. No. 14/714,153, filed on May 15, 2015, entitled "METHODS AND ELECTRONIC DEVICES FOR DYNAMIC CONTROL OF PLAYLISTS", inventors Souheil Medaghri Alaoui, et al, both of which patent applications are incorporated herein by reference in their entirety.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method of operating an electronic device for performing playback of a first media content stream and dynamically controlling a queue of subsequently playable media items, comprising:
    displaying, at a user interface of the electronic device, a plurality of selectable options corresponding to one or more properties of media items to be played, wherein, in response to a selection of one or more options within the plurality of selectable options as selected options, a proposed queue of subsequently playable media items is dynamically adjusted in real time in accordance with the selected options;
    displaying a visual queue of subsequently playable media items corresponding to the proposed queue of subsequently playable media items, at the user interface of the electronic device, wherein each media item is associated with media content of a respective media content stream; and
    while the first media content stream is being played,
        receiving, at the user interface of the electronic device, one or more user inputs indicative of selecting a first option and a second option within the plurality of selectable options,
        interpreting selection of the first option and the second option as a combination of the selected options and as a request to control playback of another media content stream in accordance with the first option and the second option, and
        while the first media content stream is continuing to being played, adjusting, in real time, the proposed queue of subsequently playable media items in dependence of the first option and the second option, including providing, at the user interface, an adjusted proposed queue of subsequently playable media items corresponding to the first option and the second option, wherein the adjusted proposed queue of subsequently playable media items includes replacement media items, in accordance with the selected options.

2. The method of claim 1, wherein adjusting the proposed queue of subsequently playable media items in dependence of the first option, comprises:
    sending a data message including an instruction to a computer server to return a proposed queue of subsequently playable media items in accordance with the first option;
    receiving a signal comprising a data message including the proposed queue of subsequently playable media items;
    generating a visual queue of subsequently playable media items corresponding to the proposed queue of subsequently playable media items; and in response thereto
    displaying the visual queue of subsequently playable media items at the user interface of the electronic device.

3. The method of claim 1, comprising:
    displaying a visual array of selectable mood options, wherein each selectable mood option is associated with a respective mood; and wherein
    receiving a first request to play another media content stream in accordance with the first option comprises receiving an instruction to select one of the selectable mood options.

4. The method of claim 3, further comprising:
    receiving a second request to play another media content stream in accordance with the second option;
    in response to receiving the second request, adjusting the proposed queue of subsequently playable media items in dependence of a combination of the first option and the second option.

5. The method of claim 4, wherein adjusting the proposed queue of subsequently playable media items in dependence of the second option, comprises:
    sending a data message including an instruction to a computer server to return a proposed queue of subsequently playable media items in accordance with the second option;
    receiving another signal comprising a data message including the proposed queue of subsequently playable media items;
    generating a visual queue of subsequently playable media items corresponding to the proposed queue of subsequently playable media items; and in response thereto
    displaying the visual queue of subsequently playable media items at the user interface of the electronic device.

6. The method of claim 4, wherein the second option comprises a genre, an artist, or a sound.

7. The method of claim 1, further comprising:
    receiving a second request to play another media content stream in accordance with the second option;

in response to receiving the second request, adjusting the proposed queue of subsequently playable media items in dependence of a combination of the first option and the second option.

8. The method of claim 7, wherein adjusting the proposed queue of subsequently playable media items in dependence of the second option, comprises:
sending a data message including an instruction to a computer server to return a proposed queue of subsequently playable media items in accordance with the second option;
receiving another signal comprising a data message including the proposed queue of subsequently playable media items;
generating a visual queue of subsequently playable media items corresponding to the proposed queue of subsequently playable media items; and in response thereto
displaying the visual queue of subsequently playable media items at the user interface of the electronic device.

9. The method of claim 7, wherein the second option comprises a genre, an artist, or a sound.

10. The method of claim 1, wherein the media content stream comprises an audio content stream.

11. The method of claim 1, wherein the one or more properties of media items to be played comprises one or more of a mood, a genre, an artist, a sound, or an energy level.

12. The method of claim 1, further comprising, while the first media content stream is being played, pre-buffering media content related to a next media content stream in the adjusted proposed queue of subsequently playable media items.

13. The method of claim 1, wherein the electronic device is used to remotely control the playback of media content at a media presentation system,
wherein, while the first media content stream is being played, a request to play another media content streaming in accordance with a first user preference is received by the electronic device, and
wherein in response to receiving the request, the queue of subsequently playable media items is adjusted, for playback at the media presentation system under remote control of the electronic device.

14. An electronic device for performing playback of a first media content stream and dynamically controlling a queue of subsequently playable media items, the electronic device comprising:
a user interface;
a processor; and
a memory storing computer program code, which, when run in the processor causes the electronic device to:
display, at the user interface, a plurality of selectable options corresponding to one or more properties of media items to be played, wherein, in response to a selection of one or more options within the plurality of selectable options as selected options, a proposed queue of subsequently playable media items is dynamically adjusted in real time in accordance with the selected options;
display a visual queue of subsequently playable media items corresponding to the proposed queue of subsequently playable media items, at said user interface, wherein each media item is associated with media content of a respective media content stream; and
while the first media content stream is being played,
receive, at the user interface, one or more user inputs indicative of selecting a first option and a second option within the plurality of selectable options,
interpret selection of the first option and the second option as a combination of the selected options and as a request to control playback of another media content stream in accordance with the first option and the second option, and
while the first media content stream is continuing to being played, adjust, in real time, the proposed queue of subsequently playable media items in dependence of the first option and the second option, including providing, at the user interface, an adjusted proposed queue of subsequently playable media items corresponding to the first option and the second option, wherein the adjusted proposed queue of subsequently playable media items includes replacement media items, in accordance with the selected options.

15. The electronic device of claim 14, further comprising:
a transmitter, and
a receiver, and wherein
the memory stores computer program code, which, when run in the processor causes the electronic device to:
send, by means of the transmitter, a data message including an instruction to a computer server to return a proposed queue of subsequently playable media items in accordance with a first option; and
receive, by means of the receiver, another signal comprising a data message including the proposed queue of subsequently playable media items;
generate a visual queue of subsequently playable media items corresponding to the proposed queue of subsequently playable media items; and in response thereto
display the visual queue of subsequently playable media items at a user interface of the electronic device.

16. The electronic device of claim 14, wherein the memory stores computer program code, which, when run in the processor causes the electronic device to:
display a visual array of selectable mood options, wherein each selectable mood option is associated with a respective mood; and
receive an instruction to select one of the selectable mood options.

17. The electronic device of claim 16, wherein the memory stores computer program code, which, when run in the processor causes the electronic device to:
receive a second request to play another media content stream in accordance with the second option,
in response to receiving the second request, adjust the proposed queue of subsequently playable media items in dependence of a combination of the first option and the second option.

18. The electronic device of claim 17, further comprising:
a transmitter, and
a receiver, and wherein
the memory stores computer program code, which, when run in the processor causes the electronic device to:
send, by means of the transmitter, a data message including an instruction to a computer server to return a proposed queue of subsequently playable media items in accordance with the second option;
receive, by means of the receiver, another signal comprising a data message including the proposed queue of subsequently playable media items;
generate a visual queue of subsequently playable media items corresponding to the proposed queue of subsequently playable media items; and in response thereto display the visual queue of subsequently playable media items at the user interface of the electronic device.

19. The electronic device of claim 17, wherein the second option comprises a genre, an artist, or a sound.

20. The electronic device of claim 14, wherein the memory stores computer program code, which, when run in the processor causes the electronic device to:
receive a second request to play another media content stream in accordance with the second option,
in response to receiving the second request, adjust the proposed queue of subsequently playable media items in dependence of a combination of the first option and the second option.

21. The electronic device of claim 20, further comprising:
a transmitter, and
a receiver, and wherein
the memory stores computer program code, which, when run in the processor causes the electronic device to:
send, by means of the transmitter, a data message including an instruction to a computer server to return a proposed queue of subsequently playable media items in accordance with the second option;
receive, by means of the receiver, another signal comprising a data message including the proposed queue of subsequently playable media items;
generate a visual queue of subsequently playable media items corresponding to the proposed queue of subsequently playable media items; and in response thereto display the visual queue of subsequently playable media items at a user interface of the electronic device.

22. The electronic device of claim 20, wherein the second option comprises a genre, an artist, or a sound.

23. The electronic device of claim 14, wherein the media content stream comprises an audio content stream.

24. A non-transitory computer readable storage medium storing one or more instructions which, when executed on at least one processor, cause the at least one processor to carry out a method comprising:
displaying, at a user interface of the electronic device, a plurality of selectable options corresponding to one or more properties of media items to be played, wherein, in response to a selection of one or more options within the plurality of selectable options as selected options, a proposed queue of subsequently playable media items is dynamically adjusted in real time in accordance with the selected options;
displaying a visual queue of subsequently playable media items corresponding to the proposed queue of subsequently playable media items, at the user interface of the electronic device, wherein each media item is associated with media content of a respective media content stream; and
while the first media content stream is being played,
receiving, at the user interface of the electronic device, one or more user inputs indicative of selecting a first option and a second option within the plurality of selectable options,
interpreting selection of the first option and the second option as a combination of the selected options and as a request to control playback of another media content stream in accordance with the first option and the second option, and
while the first media content stream is continuing to being played, adjusting, in real time, the proposed queue of subsequently playable media items in dependence of the first option and the second option, including providing, at the user interface, an adjusted proposed queue of subsequently playable media items corresponding to the first option and the second option, wherein the adjusted proposed queue of subsequently playable media items includes replacement media items, in accordance with the selected options.

* * * * *